United States Patent
Biswas et al.

(10) Patent No.: US 12,039,177 B2
(45) Date of Patent: *Jul. 16, 2024

(54) CONFIGURABLE MACHINE LEARNING SYSTEMS THROUGH GRAPHICAL USER INTERFACES

(71) Applicant: Coupa Software Incorporated, San Mateo, CA (US)

(72) Inventors: Shuvro Biswas, New York City, NY (US); Paddy Lawton, Guildford (GB); Yutaka Hosoai, San Diego, CA (US)

(73) Assignee: Coupa Software Incorporated, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/836,928

(22) Filed: Jun. 9, 2022

(65) Prior Publication Data
US 2022/0300177 A1    Sep. 22, 2022

Related U.S. Application Data

(63) Continuation of application No. 15/721,586, filed on Sep. 29, 2017, now Pat. No. 11,403,006.

(51) Int. Cl.
*G06F 3/048* (2013.01)
*G06F 3/06* (2006.01)
(Continued)

(52) U.S. Cl.
CPC ............ *G06F 3/0629* (2013.01); *G06F 3/048* (2013.01); *G06F 16/17* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 2015/0379429 A1* | 12/2015 | Lee | G09B 5/00 706/11 |
| 2016/0110657 A1* | 4/2016 | Gibiansky | G06N 20/00 706/12 |

(Continued)

*Primary Examiner* — Xuyang Xia
(74) *Attorney, Agent, or Firm* — Baker Botts L.L.P.

(57) ABSTRACT

Systems and methods for presenting configurable machine learning systems through graphical user interfaces are disclosed. In an embodiment, a machine learning server computer stores one or more machine learning configuration files. A particular machine learning configuration file of the one or more machine learning configuration files comprises instructions for configuring a machine learning system of a particular machine learning type with one or more first machine learning parameters. The machine learning server computer displays through a graphical user interface, a plurality of selectable parameter options, each of which defining a value for a machine learning parameter. The machine learning server computer receives a particular input dataset. The machine learning server computer additionally receives, through the graphical user interface, a selection of one or more selectable parameter options corresponding to one or more second machine learning parameters different from the one or more first machine learning parameters. The machine learning server computer replaces in the particular machine learning configuration file, the one or more first machine learning parameters with the one or more second machine learning parameters. Using the particular machine learning configuration file, the machine learning server computer configures a particular machine learning system. Using the particular machine learning system and the particular input dataset, the machine learning server computer computes a particular output dataset.

22 Claims, 12 Drawing Sheets

(51) Int. Cl.
  *G06F 16/17*      (2019.01)
  *G06N 20/00*      (2019.01)

(56)         References Cited

U.S. PATENT DOCUMENTS

2017/0178020 A1*  6/2017  Duggan .................. G06F 16/22
2017/0243132 A1*  8/2017  Sainani ................... H04L 41/20
2018/0032862 A1*  2/2018  Oliner ................ G06Q 10/0637
2018/0089591 A1*  3/2018  Zeiler ..................... G06F 3/048
2018/0253645 A1*  9/2018  Burr ....................... G06N 3/084
2020/0050329 A1*  2/2020  Maclean ............... G06N 20/00

\* cited by examiner

202 Storing, at a First Server Computer, One or More Machine Learning System Training Datasets, Each of the Datasets Comprising Input Data and Verified Output Data

↓

204 Receiving, at the First Server Computer, a Particular Input Dataset and a Request to Run a Machine Learning System with the Particular Input Dataset

↓

206 Sending, from the First Server Computer to a Second Server Computer Separate from the First Server Computer, the Particular Input Dataset, a Particular Machine Learning System Training Dataset of the One or More Machine Learning System Training Datasets, and One or More Particular Configuration Files for Building a Particular Machine Learning System

↓

Using the Second Server Computer, Processing the Particular Input Dataset with the Particular Machine Learning System by:

208 Configuring the Particular Machine Learning System Using the One or More Particular Configuration Files

↓

210 Training the Particular Machine Learning System Using the Particular Machine Learning System Training Dataset

↓

212 Using the Particular Input Dataset as Input into the Particular Machine Learning System, Computing a Particular Output Dataset

↓

214 Sending the Particular Output Dataset to the First Server Computer

FIG. 2

402 Storing, at a Machine Learning System Server Computer, a Plurality of Machine Learning System Training Datasets, Each Machine Learning System Dataset of the Plurality of Machine Learning System Training Datasets Comprising Input Data and Output Data

404 Displaying, through a Graphical User Interface, a Plurality of Selectable Options, Each Selectable Option of the Plurality of Selectable Options Identifying a Machine Learning System Training Dataset of the Plurality of Machine Learning System Training Datasets

406 Receiving, at the Machine Learning System Server Computer, a Particular Input Dataset and a Selection of a Particular Selectable Option Identifying a Particular Machine Learning System Training Dataset

408 Using the Machine Learning System Server Computer, Training a Particular Machine Learning System Using the Particular Machine Learning System Training Dataset

410 Using the Particular Input Dataset as Input into the Particular Machine Learning System, Computing a Particular Output Dataset

FIG. 4

Classification  Normalization  Sessions  Knowledge Base  Postprocess ▶

(1) SESSIONS  (2) SELECT COLUMNS  (3) MACHINE LEARNING  (4) PROGRESS  (5) RESULTS

Your Sessions

| ID | Uploaded File | Status | State | Machine Learning System | Created | Actions |
|---|---|---|---|---|---|---|
| SID-845 | company file A056... | Default | Progress | Fuzzy Matching | 02/07/2017 | View \| Rerun |
| SID-844 | company file A055... | Complete | Results | Fuzzy Matching | 02/07/2017 | View \| Rerun |
| SID-843 | company file A054... | Complete | Results | Encoder/Decoder | 02/07/2017 | View \| Rerun |
| SID-842 | company file A053... | Default | Select Columns | Naive Bayes | 02/07/2017 | View \| Rerun |
| SID-841 | company file A052... | Complete | Results | | 02/07/2017 | View \| Rerun |
| SID-840 | company file A051... | Default | Machine Learning | | 02/07/2017 | View \| Rerun |
| SID-839 | company file A050... | Default | Machine Learning | | 02/07/2017 | View \| Rerun |

<< previous | 1 | 2 | 3 | 4 | ... | 21 | 22 | 23 | 24 | next >>

NEW

FIG. 5

Classification  Normalization  Sessions  Knowledge Base  Postprocess ▼

① SESSIONS  ② SELECT COLUMNS  ③ MACHINE LEARNING  ④ PROGRESS  ⑤ RESULTS

Select Columns

| Merchant Category | Summary of the expenditure | Supplier Name | Net Amount | Text | Transaction ID |
|---|---|---|---|---|---|
| Hardware Purchase | Widgets | Widget USA | 30 | W549 - Widget Purchase | TX-5496 |
| Software Purchase | Modules | Software Modulers | 60 | M658 - SoftID 875mod945... | TX-5495 |
| Software Purchase | Mathematic Models | SoftModels | 12 | M234 - Software for modeling... | TX-5494 |
| Hardware Purchase | Widgets | USA Widgets | 204 | W549 - Bulk Purchase of Wid... | TX-5493 |
| Network Security | Vorpal Sword | Bandersnatch Inc. | 1 | Twas Brillig and the Slithy Tov... | JW-1212 |
| Hardware Purchase | Super Widgets | Elite Widgets | 35 | New shipment of Widgets rec... | TX-5492 |
| Hardware Purchase | Widges | Widgets USA | 75 | Widges | TX-5491 |

Description Column
- ☑ Merchant Category
- ☑ Summary of the expenditure
- ☐ Supplier Name
- ☐ Net Amount
- ☑ Text

Supplier Column
- ○ Merchant Category
- ○ Summary of the expenditure
- ● Supplier Name
- ○ Net Amount
- ○ Text

[ Next ]

FIG. 6

Classification  Normalization  Sessions  Knowledge Base  Postprocess ▶

① SESSIONS  ② SELECT COLUMNS  ③ MACHINE LEARNING  ④ PROGRESS  ⑤ RESULTS

Machine Learning

Machine Learning System
- ○ Naive Bayes
- ● Encoder Decoder
- ○ Long Short Term Memory ➕ Advanced Settings  ∨ ∨ ∨

Knowledge Base
- ☐ ZYX Learning
- ☑ Company B Learning
- ☐ Company Q Learning
- ☐ Company Y Learning
- ☐ Industry X Learning

Category
- ☐ Aerospace
- ☑ Literature
- ☐ Finance
- ☑ Education
- ☐ Automotive

[Next]

Classification  Normalization  Sessions  Knowledge Base  Postprocess ▶

① UPLOAD FILE  ② SELECT COLUMNS  ③ VERSIONS

Upload File

New Knowledge Base  Stored Knowledge Bases  Stats  Search

Enter your link https://companyshareflie.com/ro7a63dh72oyq99 or Upload your file

Drag & Drop file here or

Browse File

Submit

FIG. 10

Classification   Normalization   Sessions   Knowledge Base   Postprocess ▶

(1) UPLOAD FILE ─ (2) SELECT COLUMNS ─ (3) VERSIONS

SELECT COLUMNS

| Category | Merchant Category | Summary of the expenditure | Supplier Name | Net Amount | Text |
|---|---|---|---|---|---|
| Machinery | Hardware Purchase | Widgets | Widget USA | 30 | W549 - Widget Purchase |
| Internal Software | Software Purchase | Modules | Software Modulers | 60 | M658 - SoftID 875mod945... |
| Internal Software | Software Purchase | Mathematic Models | SoftModels | 12 | M234 - Software for model... |
| Machinery | Hardware Purchase | Widgets | USA Widgets | 204 | W549 - Bulk Purchase of ... |
| Borogoves | Network Security | Vorpal Sword | Bandersnatch Inc. | 1 | Twas Brillig and the Slithy ... |
| Machinery | Hardware Purchase | Super Widgets | Elite Widgets | 35 | New shipment of Widgets ... |
| Machinery | Hardware Purchase | Widges | Widgets USA | 75 | Widges |

Categorization
- ● Category
- ○ Merchant Category
- ○ Summary of the expenditure
- ○ Supplier Name
- ○ Net Amount

Raw Supplier
- ○ Category
- ○ Merchant Category
- ○ Summary of the expenditure
- ● Supplier Name
- ○ Net Amount

Normalized Supplier
- ○ Category
- ○ Merchant Category
- ○ Summary of the expenditure
- ○ Supplier Name
- ○ Net Amount

Description Column
- ☐ Category
- ☑ Merchant Category
- ☑ Summary of the expenditure
- ☐ Supplier Name
- ☐ Net Amount

[ Next ]

FIG. 11

CONFIGURABLE MACHINE LEARNING SYSTEMS THROUGH GRAPHICAL USER INTERFACES

BENEFIT CLAIM

This application claims the benefit under 35 U.S.C. 120 as a continuation of application Ser. No. 15/721,586, filed Sep. 29, 2017, the entire contents of which are hereby incorporated by reference for all purposes as if fully set forth herein. Applicants hereby rescind any prior disclaimer of subject matter and advise the USPTO that the claims of this application may be broader than in any priority application.

FIELD OF THE DISCLOSURE

The technical field of the disclosure generally relates to computer hardware, software, and systems that implement communications between client computing devices and server computers. The technical field of the disclosure also is computer hardware, software, and systems that are programmed to generate machine learning systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Machine learning tools allow computing devices to solve complex problems better over time. Neural networks are a type of machine learning tool that use prior inputs and outputs to generate the algorithms for solving complex problems. Generally, a neural network comprises a plurality of equations and weights for each of the equations. As inputs and outputs are fed into the neural network, the weights for the equations are altered so that the equations produce the correct outputs.

Machine learning systems are generally created to solve a particular type of problem. Example machine learning systems may be configured to classify text data, classify images, generate security responses, provide instructions, or otherwise generate particular outputs from particular inputs. Thus, computing devices tend to store a single machine learning system that is trained over time. Each time an input is fed into the machine learning system, the machine learning system is used to compute an output. If the output is incorrect, the correct output is identified, and the machine learning system modifies one or more equations and/or weights.

While storing a single machine learning system can be useful for a singular type of problem, a limitation of this approach is that the single machine learning system would be unsuitable for different types of problems that use the same inputs but need different outputs. For example, a machine learning system may be generated for classifying items based on ingredients. If the training data includes ingredients for items found in a grocery store, then the outputs would also include items found in a grocery store. If the same machine learning system was used to classify pharmaceuticals, the overlap in ingredients may lead to unintended consequences where a pharmaceutical is classified as food or vice versa.

A computer system may solve the problem of singular machine learning systems by storing a plurality of machine learning systems, each of which are trained using different training data. A downside to this approach is that storage of a different machine learning system for each type of problem becomes a large drain on the resources of the computer. While a computer may waste less memory by storing fewer machine learning systems, the computer does so at the cost of less accurate machine learning systems as the machine learning systems cannot be configured to deal with a specific problem but would have to be general enough to solve multiple types of problems.

Another issue arises if a client wishes to use multiple machine learning systems at the same time or if two clients wish to use the same machine learning system at the same time. The drain on resources for the computing device is compounded each time a machine learning system is used to compute an output. Thus, a computing device would have to be configured with enough resources to be able to be able to service a large number of clients without causing a significant increase in processing time. These extra resources would generally go to waste unless the computing device is constantly servicing a large number of clients.

Additionally, many machine learning systems are unable to produce more accurate outputs from datasets that have just gone through the machine learning system. If an input dataset comprises one thousand entries and a machine learning system is only able to classify five hundred of the entries accurately, then the remaining entries would have to be processed manually. If multiple machine learning systems of different types, with different parameters, and/or trained with different data were stored on a computing device, then the computing device could attempt to process the unclassified data with additional machine learning systems. As discussed above, storing additional machine learning systems to reprocess unclassified data increases the amount of data that has to be stored on the computing device.

Another issue exists with usability of machine learning systems. Generally, machine learning systems are configured by people knowledgeable with the programming of machine learning systems. Thus, a client who lacks knowledge in programming is unable to customize a machine learning system to the client's own needs. If different clients wish to generate different types of machine learning systems with different parameters and trained using different datasets, each machine learning system would have to be configured by someone knowledgeable in programming, thereby severely reducing the usability of machine learning systems for those not skilled in programming.

Thus, there exists a need for a system which simplifies the use of machine learning systems, such that users of various backgrounds can use the machine learning systems. Additionally, there exists a need for systems that reduce the storage costs of persistently storing a large number of machine learning systems while still maintaining the benefits of machine learning systems that are customizable for a variety of different types of problems.

SUMMARY

The appended claims may serve as a summary of the disclosure.

BRIEF DESCRIPTION OF THE DRAWINGS

In the drawings:

FIG. 2 depicts an example method of a central server computer offloading the building, training, and running of a machine learning system to separate server computers.

FIG. 4 depicts a method of selecting specific training datasets from a plurality of training datasets for training a machine learning system.

FIG. 5 depicts an example graphical user interface for viewing or reviewing one or more sessions.

FIG. 6 depicts an example graphical user interface for identifying one or more types of input data from an uploaded input file.

FIG. 7 depicts an example graphical user interface for configuring a machine learning system.

FIG. 8 depicts one or more examples of advanced settings for the machine learning system.

FIG. 10 depicts an example graphical user interface for uploading new training datasets and/or editing existing training datasets.

FIG. 11 depicts an example graphical user interface for identifying inputs and outputs in an uploaded training dataset.

DETAILED DESCRIPTION

Figure 1:
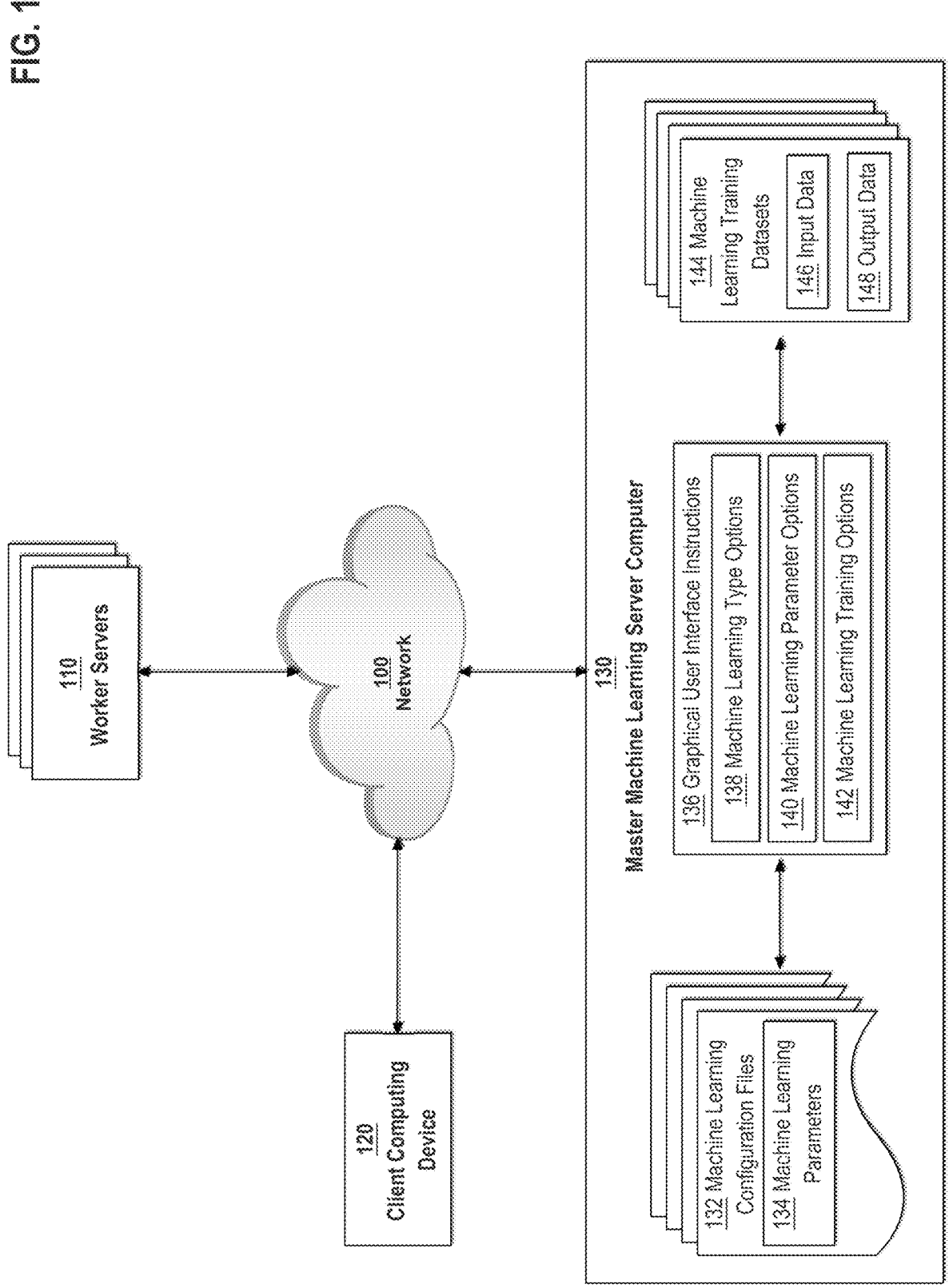
FIG. 1 depicts an example system in which the techniques described may be practiced, according to an embodiment.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:
1. GENERAL OVERVIEW
2. SYSTEM OVERVIEW
3. MACHINE LEARNING SYSTEM SLAVES
   3.1. HYPERPARAMETER OPTIMIZATION
   3.2. SCALABILITY
4. DISCRETE TRAINING BASES
5. REPROCESSING WITH NEW TRAINING DATASETS
6. MACHINE LEARNING SYSTEM USER INTERFACE
7. HARDWARE OVERVIEW
1. General Overview Systems and methods for offloading the generation, training, and use of a machine learning system to slave servers are disclosed. According to an embodiment, a machine learning server computer stores configuration files for building machine learning systems and training datasets for training machine learning systems. When a client requests processing of an input file with a machine learning system, the machine learning server computer sends a machine learning configuration file, a training dataset, and the input file to a separate server computer. The separate server computer configures a machine learning system using the machine learning configuration file, trains the machine learning system using the training dataset, computes an output dataset from the input dataset using the machine learning system, and sends the output dataset back to the machine learning server computer. The separate server may also delete the machine learning system, training dataset, configuration file, and input file after the output dataset has been sent. The use of separate servers allows the machine learning server computer to compute output datasets for different input datasets in parallel using different machine learning systems and different training datasets while reducing the amount of data stored on the machine learning server computer.

Systems and methods for increasing the variety of problems a computer can solve with a machine learning system while maintaining low storage costs are disclosed. According to an embodiment, a server computer stores a plurality of different machine learning training datasets, each comprising a plurality of inputs and outputs. When a client requests processing of an input dataset, the client may also identify a stored training dataset that relates to the client's request. The server computer may generate a machine learning system and train the machine learning system with the stored training dataset. The server computer may then compute an output dataset from the input dataset using the machine learning system. After computing the output dataset, the server computer may delete the machine learning system. By storing the machine learning training datasets and training a machine learning system as needed, the server computer is programmed to fulfill various types of client requests while minimizing the storage that would be necessary to store machine learning systems trained with different training datasets for each type of problem. Additionally or alternatively, a server computer may store a plurality of trained machine learning systems, thereby reducing the compute time of retraining a machine learning system.

Systems and methods for increasing the usability of machine learning systems are disclosed. According to an embodiment, a server computer stores a plurality of machine learning configuration files, each comprising a plurality of parameters, and one or more training datasets. The server computer provides a graphical user interface for selecting a type of machine learning system, selecting parameters for the machine learning system, and selecting training datasets for training the machine learning system. Based on the selection of a machine learning type, the server computer identifies a corresponding configuration file. The server computer updates the configuration file to include selected parameters. The server computer then generates a machine learning system and trains the machine learning system using a selected training dataset. By providing a graphical interface for selecting parameters for the machine learning system and updating the stored configuration file with the parameters, the server computer increases the usability of the machine learning system for non-experts. Additionally, the server computer provides a means for configuring different types of machine learning systems with different types of parameters on the spot.

In an embodiment, a method comprises storing, at a first server computer, one or more machine learning training datasets, each of the datasets comprising input data and verified output data; receiving, at the first server computer, a particular input dataset and a request to run a machine learning system with the particular input dataset; sending, from the first server computer to a second server computer separate from the first server computer, the particular input dataset, a particular machine learning training dataset of the one or more machine learning training datasets, and one or more particular configuration files for building a machine learning system; using the second server computer, processing the particular input dataset with a particular machine learning system by: configuring the particular machine learning system using the one or more particular configuration files; training the particular machine learning system using the particular machine learning training dataset; using the particular input dataset as input into the particular machine learning system, computing a particular output dataset; sending the particular output dataset to the first server computer.

In an embodiment, a method comprises storing, at a machine learning server computer, a plurality of machine learning training datasets, each machine learning training dataset of the plurality of machine learning training datasets comprising input data and output data; displaying, through a graphical user interface, a plurality of selectable options, each selectable option of the plurality of selectable options identifying a machine learning training dataset of the plurality of machine learning training datasets; receiving, at the machine learning server computer, a particular input dataset and a selection of a particular selectable option identifying a particular machine learning training dataset; training a particular machine learning system using the particular machine learning training dataset; using the particular input dataset as input into the particular machine learning system, computing a particular output dataset.

In an embodiment, a method comprises storing, at a machine learning server computer, one or more machine learning configuration files, a particular machine learning configuration file of the one or more machine learning configuration files comprising instructions for configuring a machine learning system of a particular machine learning type with one or more first machine learning parameters; displaying, through a graphical user interface, a plurality of selectable parameter options, each of which defining a value for a machine learning parameter; receiving, at the machine learning server computer, a particular input dataset; receiving, through the graphical user interface, a selection of one or more selectable parameter options corresponding to one or more second machine learning parameters different from the one or more first machine learning parameters; replacing, in the particular machine learning configuration file, the one or more first machine learning parameters with the one or more second machine learning parameters; using the particular machine learning configuration file, configuring a particular machine learning system; using the particular machine learning system and the particular input dataset, computing a particular output dataset.

2. System Overview

FIG. 1 depicts an example system in which the techniques described may be practiced, according to an embodiment.

In the example of FIG. 1, worker servers 110, a client computing device 120, and a master machine learning server computer 130 are communicatively coupled to a data communications network 100. The network 100 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The worker servers 110, client computing device 120, master machine learning server computer 130, and other elements of the system each comprise an interface compatible with the network 100 and are programmed or configured to use standardized protocols for communication across the networks such as TCP/IP, Bluetooth, and higher-layer protocols such as HTTP, TLS, and the like.

Worker servers 110 may be implemented using server-class computers or other computers having one or more processor cores, co-processors, or other computers. Worker servers 110 may be physical server computers and/or virtual server instances stored in a data center, such as through cloud computing. Each of worker servers 110 may be programmed or configured to execute instructions sent by the master machine learning server computer 130.

Client computing device 120 is a computer that includes hardware capable of communicatively coupling client computing device 120 to one or more server computers, such as master machine learning server computer 130 over one or more service providers. For example, client computing device 120 may include a network card that communicates with master machine learning server computer 130 through a home or office wireless router (not illustrated in FIG. 1) coupled to an internet service provider. Client computing device 120 may be a smart phone, personal computer, tablet computing device, PDA, laptop, or any other computing device capable of transmitting and receiving information and performing the functions described herein.

Master machine learning server computer 130 may be implemented using a server-class computer or other computers having one or more processor cores, co-processors, other computers. FIG. 1 depicts worker servers 110 and master machine learning server computer 130 as distinct elements to illustrate a clear example. However, in other embodiments, more or fewer server computers may accomplish the functions described herein. For example, a plurality of client computing devices may connect to the master machine learning server computer 130. As another example, an embodiment may be practiced with a single worker server 110.

Master machine learning server computer 130 stores one or more machine learning configuration files 132. The machine learning configuration files comprise executable instructions which cause generation of particular types of machine learning systems. For example, the master machine learning server computer 130 may store a first set of configuration files for building a Naïve Bayes classifier. The master machine learning server computer 130 may additionally store a second set of configuration files for building a Long Short Term Memory neural network. Configuration files for building neural networks and other machine learning systems are generally available on Github and TensorFlow.

In an embodiment, the machine learning configuration files comprise machine learning parameters 134. Machine learning parameters 134 refer to configuration options for the machine learning system. Examples of machine learning parameters 134 include a number of nodes of a machine learning system, a number of layers of a machine learning system, a vector size of a machine learning system, and any other configurable values for the machine learning system. In an embodiment, the machine learning configuration files store default parameters for the machine learning parameters 134. For example, a particular machine learning configuration file may store a default configuration of two layers for building the machine learning system. In another embodiment, the machine learning configuration files store placeholder parameters. Placeholder parameters contain blank values and/or default parameters until they are filled in, such as through input into a graphical user interface.

Master machine learning server computer 130 stores graphical user interface instructions 136. Graphical user interface instructions 136 comprises a set of one or more pages of main memory, such as RAM, in a server computer into which executable instructions have been loaded and which when executed cause the master machine learning server computer to perform the functions or operations that are described herein with reference to those modules. For example, the graphical user interface instructions 136 may comprise a set of pages in RAM that contain instructions which when executed cause displaying a graphical user interface, responding to user computer input, and/or changing stored data records based on received user computer input.

The instructions may be in machine executable code in the instruction set of a CPU and may have been compiled based upon source code written in JAVA, PYTHON, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, graphical user interface instructions 136 also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figures may represent the manner in which programmers or software developers organize and arrange source code for later compilation into an executable, or interpretation into bytecode or the equivalent, for execution by the master machine learning server computer.

Master machine learning server computer 130 stores one or more machine learning training sets 144 comprising input data 146 and output data 148. The machine learning training sets 144 refer to data for training machine learning systems. Input data 146 comprises data elements that function as raw inputs to a machine learning system. Output data 148 comprises data elements that correspond to the data elements of input data 146 and function as desired outputs for the raw inputs. For example, a classification training data set may include a plurality of sets of description inputs. Each set of description inputs may correspond to a particular classification output. The classification outputs may be manually determined for the training datasets and/or determined through use of one or more algorithms and/or prior usage of a machine learning system. Generally, outputs in the training datasets are verified as being the desired outputs for the corresponding inputs.

The system may additionally include an external storage system, such as a physical server computer and/or a cloud server computer (not shown). In such a system, one or more of the machine learning training sets 114, machine learning configuration files 132, or generated machine learning systems may be stored on the external storage system.

While the disclosure generally refers to machine learning systems used for classification and normalization, the methods described herein may be employed with different types of machine learning systems. For example, the master machine learning server computer 130 may store a convolution neural network configuration file as well as training data relating images to different types of outputs. The configuration files may differ in types of parameters as well as types of machine learning system. For example, some machine learning systems may include a vector length for words while others contain parameters that weight spatial relationships to each other.

3. Machine Learning Slaves

In an embodiment, the master machine learning server computer offloads the building, training, and running of a machine learning system to a slave server computer, such as worker servers 110.

FIG. 2 depicts an example method of a central server computer offloading the building, training, and running of a machine learning system to separate server computers.

At step 202, a first server computer stores one or more machine learning training datasets, each of the datasets comprising input data and verified output data. The training datasets are sets of input and output data that are used to train a machine learning system. For example, a training dataset for classification problems may include a column of descriptions and a column of classifications. A dataset may include multiple inputs and/or multiple outputs. For example, a single set of input data may have a classification output and a normalization output. As another example, multiple columns of inputs may be used for a single classification output.

The training datasets may be generated by a user computer and uploaded to the master machine learning server computer in a compatible format. For example, training datasets may be uploaded as pairs of input and output data or as columns of input data followed by columns of corresponding output data. One example method of uploading training datasets is described further herein in Section 6.

In an embodiment, the first server computer stores a plurality of training datasets. The master machine learning server computer may store multiple training datasets for a same type of problem, such as classification, and/or for different types of problems. For example, the first server computer may store a first training dataset for classification of text data and a second training dataset for classification of image data. Different datasets for similar types of problems may be stored with data identifying the datasets. For example, a first dataset may be identified as a training dataset for classification of purchase orders while a second training dataset may be identified as a training dataset for classification of educational materials. While both datasets may include the same types of inputs and the same types of outputs, they may be stored as different datasets so that they can be used separately.

At step 204, a particular input dataset and a request to run a machine learning system with the particular dataset is received at the first server computer. For example, a client computing device may upload an input dataset to the first server computer. The input dataset may comprise a plurality of inputs for which outputs are requested. Methods for uploading input datasets are described further herein in Section 6. The client computing device may also send a request to the first server computer to produce one or more output datasets using the particular input dataset and a machine learning system.

At step 206, the particular input dataset, a particular machine learning training dataset of the one or more machine learning training datasets, and one or more particular configuration files for building a particular machine learning system are sent from the first server computer to a second server computer. The one or more particular configuration files comprise instructions which, when executed, cause a server computer to generate a machine learning system. The one or more particular configuration files may be for a machine learning system of a particular type designated by the client computing device. For example, the client computing device may request a Long Short Term Memory (LSTM) neural network for processing the particular input dataset. In response to the request, the first server computer may identify a configuration file for building a LSTM neural network in memory of the first server computer and send the configuration file with the one or more machine learning training datasets and the particular input dataset to the second server computer.

In an embodiment, the second server computer processes the particular dataset with the particular machine learning system. Processing the particular dataset generally refers to computing one or more outputs for the input of the particular dataset through the use of a machine learning system. Steps for processing the particular dataset with the particular machine learning system are described further in steps 208-212.

At step 208, the particular machine learning system is configured using the one or more particular configuration files. For example, the second server computer may execute instructions of the one or more particular configuration files in order to build the particular machine learning system as specified by the one or more particular configuration files.

At step 210, the particular machine learning system is trained using the particular machine learning training dataset. For example, the second machine learning computer may use the inputs and outputs of the one or more particular training datasets to compute weights for individual nodes of the particular machine learning system. The training process for a machine learning system generally comprises identifying the outputs as "correct" values for the inputs. The machine learning system then adjusts the weights of each node in order to most accurately produce the "correct" values of the outputs from the inputs.

At step 212, the particular input dataset is used as input into the particular machine learning system in order to computer a particular output dataset. For example, after the machine learning system has been trained using the one or more particular training datasets, the second server computer may use the machine learning system to compute individual outputs from the individual inputs of the particular input dataset. The second server computer may then combine the individual outputs into a particular output dataset. In an embodiment, the output dataset includes the input dataset. For example, the output dataset may comprise a plurality of columns where one or more columns include the inputs, and one or more columns include corresponding outputs.

At step 214, the particular output dataset is sent to the first server computer. After the output dataset has been sent back to the first server computer, the first server computer may send the output dataset to the client computing device. Additionally, the second server computer may be programmed or configured to delete the machine learning system, training data, input data, and output data from the second server computer after the output data has been sent to the first server computer. This allows the second server computer to reduce the amount of storage used on the second server computer, as a machine learning system is only stored for the time that it is used. Thus, if the second server computer later receives a different configuration file for a machine learning system, the second server computer may generate a second machine learning system without still storing data from the first machine learning system.

In an embodiment, the second server computer saves the trained machine learning system. For example, the second server computer may save the trained machine learning system on a storage server computer such as a cloud server. Thus, the second server computer may be utilized for training and running machine learning systems while a cloud server is utilized for storing training datasets, configuration files, and trained machine learning systems. By saving the trained machine learning systems on a separate storage computer, the system reduces the compute time caused by retraining the machine learning system.

While FIG. 2 depicts the use of a central server computer and a separate server computer, methods may be implemented using any number of separate server computers. For example, the first server computer may send the data for configuring, training, and running the particular machine learning system to the second server computer as in the example of FIG. 2. The first server computer may additionally send data for configuring, training, and running a second machine learning system to a third server computer separate from the second server computer. The data sent to the third server computer may include the same or different input dataset, the same or different training dataset, and the same or different configuration file.

The methods described herein allow multiple server computers to run different machine learning systems simultaneously. For example, if multiple clients request classification of different data through different machine learning systems, the first server computer may offload the building, training, and running of the machine learning systems to multiple server computers, thereby reducing the load on the first server computer while maximizing efficiency in processing the client requests. Additionally, running multiple machine learning systems in parallel on different server computers allows for the same machine learning systems and/or the same training data to be used with different inputs at the same time.

Additionally, the methods described herein allow for the efficient consumption of resources based on need. When there is no data being processed, none of the additional server computers are being used. When multiple classifications are needed at the same time, multiple servers may be contacted for building, training, and running the machine learning systems. When the multiple servers are done, the data may be deleted, and the usage of the servers may be reduced. Thus, the methods described herein are adaptable to different needs of a server system for the processing of data through machine learning systems.

3.1. Hyperparameter Optimization

In an embodiment, multiple separate server computers may be used to provide multiple outputs for an input dataset, increase the accuracy of results for an input dataset, and/or select one or more of the best parameters, training data, and/or machine learning type for a particular training dataset, machine learning type, and/or category of data.

In an embodiment, the first server computer uses multiple server computers to provide multiple outputs for an input dataset. For example, the first server computer may send the input dataset with a first machine learning configuration file for a first type of machine learning system to a second server computer. The first server computer may also send the input dataset with a second configuration file for a second type of machine learning system to a third server computer. The first server computer may repeat this process with any number of additional server computers. As each server computer builds a different type of machine learning system, the output data files may differ with the server computers. By using different machine learning systems, the server computer is able to simultaneously generate multiple outputs which may be accurate in different areas from each other.

In an embodiment, the first server computer uses the multiple outputs to increase the accuracy of an output dataset sent to the client computing device. For example, some machine learning systems produce, along with the output, a confidence score identifying the likelihood that the produced output is the "correct" output. The first server computer may select an output dataset by selecting the output dataset with the highest average confidence score. Additionally and/or alternatively, the first server computer may store a confidence score threshold, indicating a confidence score value above which the output will be assumed to be correct. As an example, a confidence score threshold may be set to 80%, thereby indicating that any output value with a confidence score over 80% is assumed to be correct. The first server computer may select an output dataset by selecting the output dataset with the highest number of confidence scores above the confidence score threshold. The first server computer may store the selected output dataset and delete the unselected output datasets.

The first server computer may additionally combine data from output datasets to create a more accurate dataset. For example, the first server computer may select output values from each dataset that is associated with the higher confidence score. Thus, the output value for a first input value may be selected from a first output dataset while the output value for a second input value may be selected from a second output dataset. By using values from multiple output datasets received from multiple servers, the first server computer is programmed to create a more accurate output dataset without increasing the amount of time a computing device needs to run a machine learning system or increasing the number of machine learning systems a single computer needs to run.

In an embodiment, the first server computer uses multiple server computers to select optimal parameters for machine learning types, training datasets, size of training datasets, and/or categories of input data. For example, multiple servers may build machine learning systems with different values for various parameters. Based on which server computer produces the most accurate results, the first server computer may identify particular parameters as optimal parameters for machine learning systems of a particular type, training datasets, size of training datasets, and/or categories of input data.

Figure 3:
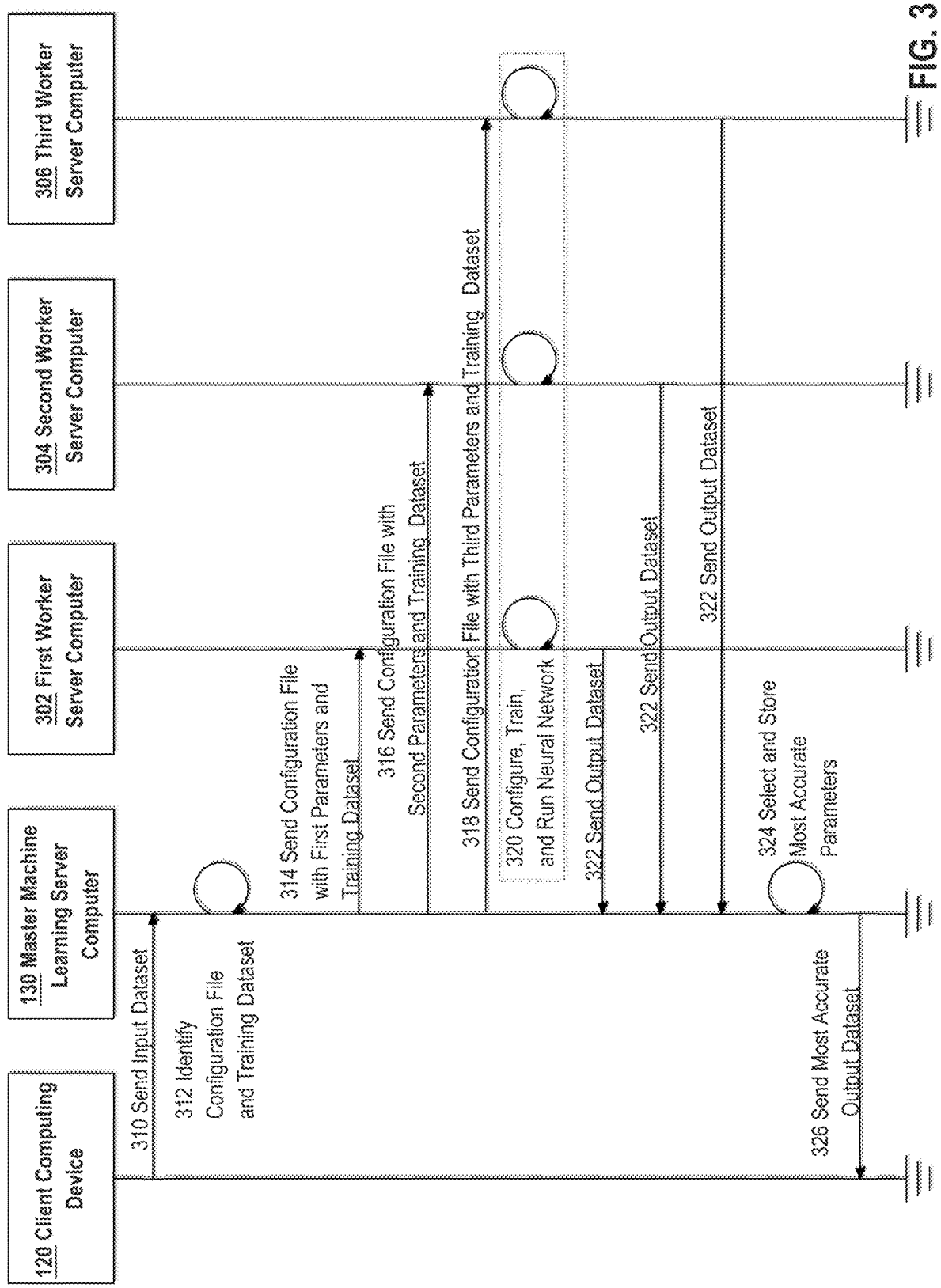
FIG. 3 depicts a message diagram illustrating communications between a client computing device, a master machine learning system, and three worker server computers.

FIG. 3 depicts a message diagram illustrating communications between a client computing device, a master machine learning server computer, and three worker server computers. The elements of FIG. 3 include client computing device 120, master machine learning server computer 130, first worker server computer 302, second worker server computer 304, and third worker server computer 306.

While FIG. 3 shows a limited number of worker server computers for illustrating an example, the methods described herein may be employed with any number of machine learning systems, thereby allowing for greater accuracy in selecting optimal parameters. For example, given three parameter types with three possible values, twenty-seven combinations of parameters exist. Thus, to find the best combination of parameters, the first server computer may run a single machine learning system on each of twenty-seven servers, one to two machine learning systems on each of fourteen servers, or any other division across multiple servers. Additionally, the methods described herein may be performed multiple times. For example, the methods may be performed a first time for selecting a first set of parameters and a second time for selecting a second set of parameters.

At step 310, the client computing device sends an input dataset to master machine learning server computer 130. At step 312, master machine learning server computer 130 identifies a configuration file and a training dataset. For example, the client computing device may upload an input dataset to master machine learning server computer for processing. The master machine learning server computer 130 may select a default machine learning type and/or may receive a selection of a machine learning type from the client computing device. The master machine learning system may then identify a configuration file that matches the machine learning type.

At steps 314, 316, and 318, master machine learning server computer 130 sends the configuration file and the training dataset to first worker server computer 302, second worker server computer 304, and third server computer 130 respectively with first parameters, second parameters, and third parameters respectively. The parameters generally refer to configuration options for the machine learning system. The first parameters, second parameters, and third parameters may comprise the same parameter types, but with different values. For example, the first parameters may include a vector size of 100, the second parameters may include a vector size of 250, and the third parameters may include a vector size of 500.

In an embodiment, sending the configuration file with different parameters comprises sending different versions of the configuration file. For example, the master machine learning server computer may be programmed or configured to change a line of code in a configuration file that defines the value for a particular parameter. Thus, in the example above, the master machine learning server computer may change the portion of the code that identifies the vector size in each configuration file such that the first configuration file identifies a vector length of 100, the second configuration file identifies a vector length of 250, and the third configuration file identifies a vector length of 500.

At step 320, each of first worker server computer 302, second worker server computer 304, and third worker server computer 306 configure, train, and run machine learning systems based on the configuration files. Each server computer may build a slightly different machine learning system of the same type based on different parameters. Thus, in the example above, the first worker server computer may build a Naïve Bayes classifier with a vector size of 100 while the second worker server computer may build a Naïve Bayes classifier with a vector size of 250. Each worker server computer trains the machine learning system with same training data and runs the machine learning system with the same input dataset to produce an output dataset.

At step 322, each of first worker server computer 302, second worker server computer 304, and third worker server computer 306 send output datasets to master machine learning server computer 130. Additionally, each of the worker server computer may delete the training datasets, input dataset, machine learning configuration file, and machine learning system. The output dataset may additionally include the input dataset as described in section 3.

At step 324, master machine learning server computer 130 selects and stores one or more parameters identified as the most accurate parameters. Master machine learning server computer 130 may select parameters by determining which output dataset includes the most accurate outputs. For example, each output dataset may include confidence scores for the output values. Master machine learning server computer 130 may select an output dataset with the highest average confidence score and/or an output dataset with the highest number of confidence scores above a confidence score threshold. Additionally or alternatively, the master machine learning server computer 130 may cause display of the plurality of output datasets and confidence scores, thereby allowing a user to manually select output datasets. The server computer may additionally allow a user to select a threshold confidence score and, in response to the selection, display with each dataset a value identifying a number of confidence scores above the selected threshold.

Once the master machine learning system has identified an output dataset as a most accurate output dataset, the master machine learning system may identify the parameters that were used to create the output dataset as preferable to the parameters that were used to create the other output datasets. The master machine learning server computer may first identify a source of the output dataset. For example, the master machine learning server computer may determine that the third server computer sent the selected dataset. Based on the determination, the master machine learning system may determine which parameters were sent to the third server computer that differ from parameters sent to the other two server computers. Thus, in the above example, the master machine learning server computer may select the vector size 500 as an optimal parameter over a vector size of 250 and a vector size of 100, but if each server computer used the same number of buckets, no parameter for number of buckets would be selected as an optimal parameter.

The optimal parameters may then be stored on master machine learning server computer as default parameters for a type of machine learning system, training dataset, size of training dataset, and/or category of input data. As an example, if the hyperparameter optimization techniques described herein are used to determine the optimal parameters for a particular training dataset, then the master machine learning server computer may store data associating the particular training dataset with the optimal parameters. Thus, in a future use of the particular training dataset, the master machine learning server computer may default to a selection of the optimal parameters for placement in a machine learning configuration file. The same technique may be used to find optimal parameters for a training dataset of a particular size. For example, parameters may be selected for training datasets of between 100,000 and 500,000 entries, thereby allowing the parameters to be changed as the amount of available training data changes.

Optimal parameters may also be stored as defaults for particular types of machine learning systems. For example, different types of machine learning systems may comprise different types of parameters. The hyperparameter optimization techniques described herein may be used to identify optimal values for a type of machine learning system. Thus, when the type of machine learning system is selected, the optimal values for the parameters of the machine learning system may be preselected as defaults. Additionally or alternatively, the machine learning server computer may update stored configuration files for a machine learning system with the optimal parameters identified using the hyperparameter optimization techniques described herein. Thus, if the optimal vector size is identified as 250 for an Encoder Decoder machine learning system, the first server computer may update a stored Encoder Decoder configuration file to include the value of 250 for the vector size parameter.

Optimal parameters may also be stored as defaults for any combination of a type of machine learning system, training dataset, size of training dataset, and/or category of input data. For example, default parameter values may be stored for an Encoder Decoder neural network trained with a first training dataset and for an Encoder Decoder neural network trained with a second training dataset. Thus, when the Encoder Decoder neural network is used at a future time, the default parameters for the Encoder Decoder neural network may be defined by the selected machine learning training dataset.

At step 326, the master machine learning server computer sends the most accurate output dataset to client computing device 120. The master machine learning server computer may also delete output datasets that were not identified as the most accurate. Additionally or alternatively, the master machine learning server computer may generate an output dataset that combines the most accurate results from multiple output datasets. For example, the master machine learning server computer may select as each output value, a value from one of the output datasets that is associated with the highest confidence score. In an embodiment, the master machine learning server computer displays results from each of the output datasets, thereby allowing a user to manually select results for each row of the dataset from different output datasets.

The master machine learning server computer may use the hyperparameter optimization techniques described herein to identify optimal parameters by building a plurality of machine learning systems on different server computers with different parameters and inputting the same training data and input data. By using multiple server computers, the master machine learning server computer is programmed to efficiently identify optimal parameters while limiting resource use. Additionally, the master machine learning server computer may save memory by only storing parameter values, configuration files, and training datasets and letting the separate servers build, train, use, and then delete or store machine learning systems from the configuration files. The master machine learning server computer may store the parameter values, configuration files, and training datasets locally and/or on a separate server computer, such as a cloud server. The master machine learning server computer may additionally store the trained machine learning systems locally and/or on a separate server computer.

3.2. Scalability

In an embodiment, the master machine learning server computer selects server computers for building, running, and training machine learning systems based on the size of the machine learning systems. For example, server computers may be commercially available for use at varying prices based on a number of graphics cards and/or memory. Additionally or alternatively, the master machine learning server computer may have access to a plurality of server computers with different capabilities.

When the master machine learning server computer receives a request to process an input dataset with a machine learning system, the master machine learning server computer may identify a size of the requested machine learning system. The size of the machine learning system may be based on a machine learning type, machine learning parameters, and/or selected training datasets. Based on the size of the machine learning system, the master machine learning server computer may determine a minimum size for a worker server computer to be able to build the machine learning system. For example, the master machine learning server computer may determine that a particular machine learning system requires a server computer with at least six (6) Gb of RAM.

In an embodiment, server computers are selected based on type of machine learning system, size of uploaded datasets, advanced settings, and/or other factors. As an example, the master machine learning server computer may store a table that identifies server computer types based on machine learning systems. As another example, the master machine learning server computer may store data indicating server requirements based on different factors. For instance, Naïve Bayes classifiers and Fuzzy Matching systems may not require a GPU. Thus, if a Naïve Bayes classifier is selected, the master machine learning computer system may determine that a server computer with a CPU and no GPU may be used.

Additionally, the master machine learning server computer may store data indicating server requirements based on a size of input datasets, size of training datasets, and/or advanced settings. For example, the data may indicate that a baseline of four (4) Gb of RAM should be used. The data may also identify a threshold number of rows in the dataset which, if exceeded, would require an additional two (2) Gb of RAM. In this manner, master machine learning server computer may increase the RAM requirements for each factor that increases the size of the computation.

The master machine learning server computer may select a server computer based on the requirements of the machine learning system. In an embodiment, the master machine learning server computer selects the lightest server that can meet the requirements for the machine learning system. For example, one server may comprise five (5) Gb of RAM while a second server comprises ten (10) Gb of RAM. If a particular machine learning system requires six (6) Gb of RAM, the master machine learning server computer may select the second server computer as the first server computer only comprises five (5) Gb of RAM. If the particular machine learning system only requires four (4) Gb of RAM, the master machine learning server computer may select the first server computer, as the first server computer has the lowest amount of RAM while still being capable of meeting the needs of the machine learning system.

The use of multiple server computers with different capabilities allows the master machine learning system to scale server usage based on the difficulty of the problem. More complex problems may be offloaded to larger server computers, thereby allowing the master machine learning system to generate larger machine learning systems. On the other hand, less complex problems may be offloaded to smaller server computers, thereby reducing wasted computing power caused by a single larger server computer being used for machine learning systems of varying sizes.

In an embodiment, the master machine learning system additionally scales problems by splitting up input datasets and running the split inputs in parallel on different server computers. For example, if a client computing device requests a machine learning system be run on a particularly long input dataset, the master machine learning server computer may split the input dataset into multiple smaller datasets. The master machine learning server computer may then send the split input datasets to a plurality of server computers, such that each server computer is responsible for generating an output dataset off of a different input dataset. When the master machine learning server computer receives the output datasets, the master machine learning server computer may combine the output datasets into a single output dataset.

By using multiple server computers to process different portions of an input dataset, the master machine learning server computer may reduce the resource requirement for each server computer as well as increase the speed with which the input dataset is processed. This allows larger projects to still be completed in smaller periods of time.

4. Discrete Training Bases

In an embodiment, a machine learning server computer increases the accuracy of various machine learning systems by storing a plurality of discrete training datasets. FIG. 4 depicts a method of selecting specific training datasets from a plurality of training datasets for training a machine learning system.

At step 402, a plurality of machine learning training datasets is stored on a machine learning server computer where each machine learning dataset of the plurality of machine learning training datasets comprise input data and output data. The machine learning training datasets may be stored as separate files with data identifying the machine learning training datasets. Each machine learning training dataset may comprise different inputs and outputs. For example, a first training dataset may include purchase order descriptions as inputs and classifications as outputs while a second training dataset may include descriptions of pharmaceuticals as inputs and pharmaceutical names as outputs.

In an embodiment, one or more client computing devices upload the machine learning training datasets to the machine learning server computer. For example, a plurality of clients may each upload machine learning training datasets that are relevant to specific problems of the clients. Thus, a client dealing with pharmaceuticals may upload a first training dataset for classifying pharmaceuticals while a client interested in software purchases may upload a second training dataset for classifying information in purchase orders. Methods for uploading new training datasets to a server computer are described further herein in Section 6.

At step 404, a plurality of selectable options is displayed through a graphical user interface where each selectable option of the plurality of selectable options identify a machine learning training dataset of the plurality of machine learning training datasets. For example, the machine learning server computer may provide a graphical user interface to a client computing device that includes options for selecting the stored pharmaceutical training dataset or the stored software purchase dataset. Each selectable option may include the name of one or more of the stored training datasets.

At step 406, a particular input dataset and a selection of a particular selectable option identifying a particular machine learning training dataset is received at the machine learning server computer. For example, a client computing device may upload an input dataset comprising a plurality of entries that a user of the client computing device wishes to be classified. The user of the client computing device may additionally select a machine learning training dataset that most fits the user's classification problem. Thus, if a user wishes to classify pharmaceuticals, the user may select the option for the pharmaceutical training dataset.

In this disclosure, for convenience, certain aspects of function or operation of inventive embodiments are described using references to user action. Each and every reference to user action is intended to include action by a user computer or client computer, and not exclusively to human action. For example, a user selection of an operation is intended to encompass receiving input from a user computer that specifies the selection. Therefore, the scope of the claims is intended to include exclusively machine operations rather than human actions.

In an embodiment, the graphical user interface includes options for selecting a plurality of training datasets. For example, the machine learning server computer may store multiple pharmaceutical training datasets received from different companies. The user may select each pharmaceutical training dataset that the user believes will be applicable to the user's problem. As another example, a first training dataset may include purchase orders for grocery stores while a second training dataset includes purchase orders for clothing stores. If a particular store sells both clothing and groceries, a client may select both the grocery training dataset and the clothing training dataset for classifications of purchase orders for the particular store.

The input dataset may be received by the machine learning server computer either before or after the training datasets are displayed on the machine learning server computer. For example, one implementation may include a first interface for uploading an input dataset. After the input dataset is uploaded, the graphical user interface may display training dataset options. In a second implementation, a first graphical user interface includes options for selecting the training dataset and a second graphical user interface incudes options for uploading an input dataset. In a third implementation, a single interface may include options for selecting the training dataset and options for uploading an input dataset, thereby allowing the user to perform selecting training datasets and uploading input datasets in any order.

At step 408, the machine learning server computer trains a particular machine learning system using the particular machine learning training dataset. For example, the machine learning server computer may build a machine learning system using a machine learning configuration file and train the machine learning system using the selected machine learning training dataset. Additionally or alternatively, a first server computer may offload the building, training, and running of the machine learning system to a separate server computer. Thus, the first server computer may identify the selected training dataset based on the user input and send the select training dataset to the separate server computer.

At step 410, the particular input dataset is used as input into the particular machine learning system in order to compute a particular output dataset. For example, after the machine learning system has been trained using the selected training dataset, each input of the particular input dataset may be processed by the machine learning system to produce an output. The outputs may then be combined into an output dataset. The output dataset may then be sent to a client computing device.

In an embodiment, after the machine learning server computer generates the output dataset, the machine learning server computer deletes the particular machine learning system. Thus, the machine learning server computer may generate machine learning systems prior to use by using stored datasets and remove the machine learning systems after they have been used. This allows the machine learning server computer to run machine learning systems that have been trained with various different types of training datasets without requiring the machine learning server computer to store configured machine learning systems for each type of data. Instead, the machine learning server computer is able to generate multiple different machine learning systems, train the machine learning systems, and produce outputs from the machine learning systems without increasing the amount of data continuously stored on the machine learning server computer from the generated machine learning systems.

Additionally or alternatively, the machine learning server computer may store trained machine learning systems on a separate storage device. For example, the machine learning server computer may generate the machine learning system, produce a result, and then save the machine learning system on a cloud server computer. Saving the machine learning systems on a separate storage device allows the machine learning server computer to save on memory while providing an already trained machine learning system for solving similar types of problems in the future, thereby saving on the compute time required to train the machine learning system.

The machine learning server computer may additionally use verified outputs from the particular machine learning system to update training datasets. Updating the training datasets may occur automatically or in response to a request from a client computing device. For example, the client computing device may initially verify the particular output dataset, such as by indicating which items in the output dataset were correct or incorrect and by correcting any incorrect items in the particular output dataset. The client computing device may then identify one or more training datasets to which to add the particular input dataset and the particular output dataset. The machine learning server computer may append the additional inputs from the particular input dataset to the inputs of the identified training datasets and the additional outputs from the particular output dataset to the outputs of the identified training datasets.

5. Reprocessing with New Training Datasets

In an embodiment, the machine learning server computer utilizes the plurality of different training datasets to increase the accuracy of outputs from the input dataset. For example, the machine learning server computer may perform the steps of FIG. 4 as described above to produce a first output dataset. The machine learning server computer may then train a second machine learning system using one or more different machine learning training datasets to produce a second output dataset. The machine learning server computer may then combine the two output datasets into a single output dataset.

In an embodiment, the machine learning server computer determines that one or more outputs of the first output dataset are inaccurate. For example, the machine learning server computer may store a confidence score threshold value. The machine learning server computer may identify outputs that have confidence scores below the confidence score threshold value. The machine learning server computer may then identify the inputs that correspond to the outputs that have confidence scores below the confidence score threshold value. The machine learning server computer may then process the identified inputs at a second stage of processing by training a new machine learning system with a different training dataset and using the new machine learning system to compute new outputs from the identified inputs.

For new outputs with confidence scores above the confidence score threshold, the machine learning server computer may replace the outputs in the first output dataset with the new outputs. If the machine learning server computer identifies new outputs with confidence scores below the confidence score threshold, the machine learning server computer may reprocess the corresponding inputs with a third machine learning system trained with a third training dataset. The machine learning server computer may continue training new machine learning systems until the machine learning server computer has produced outputs with confidence scores above the confidence score threshold for each input.

In an embodiment, the server computer displays the output dataset with confidence scores on the client computing device and waits for a selection of particular outputs for rerunning with different machine learning systems and/or training datasets. This allows a user to manually select the accurate outputs while still performing a classification on the remainder of the outputs.

Additionally or alternatively, the machine learning server computer may reprocess input data with new training datasets a limited number of times. For example, the machine learning server computer may identify to a client computing device the inputs that produced outputs below the confidence score threshold. The machine learning server computer may provide an interface comprising options for reprocessing the identified inputs with different training datasets. If the machine learning server computer receives a selection of a different training dataset and a request to reprocess the identified inputs, the machine learning server computer may train a new machine learning system with the different training dataset and reprocess the identified inputs.

In some embodiments, the training datasets for each round of processing are identified by the client computing device. For example, the client computing device may select a new training dataset each time the machine learning server computer identifies inputs that produced outputs with confidence scores below the confidence score threshold. As another example, the client computing device may initially select a plurality of training datasets to be used in various stages of processing. Thus, the client computing device may select a first training dataset for a first processing step and a second training dataset for a second processing step. As another option, the client computing device may select a plurality of training datasets and the machine learning server computer may select combinations of one or more of the client selected training datasets for each stage of processing.

In an embodiment, at each stage of processing, the machine learning system allows a client computing device to select a plurality of training datasets. Additionally, the graphical user interface may include options for combining a prior used training dataset with additional training datasets. Thus, if the client computing device initially selected a first training dataset for training the machine learning system, the client computing device may select a combination of the first training dataset and a second training dataset for the second stage of processing.

In an embodiment, the machine learning server computer automatically selects a second machine learning training dataset for processing the input dataset. For example, the client computing device may identify a category for the input dataset to the machine learning server computer. The server computer may additionally store data identifying a category for each of the machine learning training datasets. The machine learning server computer may select the second training dataset from a category that matches the category of the input dataset. For example, if the machine learning server computer stores two training datasets in the Pharmaceuticals category and the input dataset is identified as being in the Pharmaceuticals category, then the machine learning server computer may select one or more of the two training datasets for processing the input dataset at a second stage of processing.

Additionally or alternatively, the machine learning server computer may store data identifying past results of machine learning systems trained with different machine learning training datasets. For example, the machine learning server computer may store three training datasets in the category of Pharmaceuticals. Each time an input dataset is processed with a training dataset, the machine learning server computer may store data identifying a percentage of outputs with confidence scores over the confidence score threshold. The machine learning server computer may be programmed or configured to select the training dataset that has the highest average percentage of outputs with confidence scores over the confidence score threshold as the next training dataset for processing input data.

In an embodiment, the machine learning server computer associates training datasets with particular types of machine learning systems. For example, the machine learning server computer may store a plurality of configuration files for a plurality of different types of machine learning systems. A particular training dataset may be associated with a particular configuration file. Thus, if a client computing device selects the particular training dataset for processing an input dataset, the machine learning server computer may select the associated configuration file and build the machine learning system specified by the configuration file. Alternatively, the training datasets may be associated with default machine learning types. Thus, while the machine learning server computer may initially select a machine learning type based on the selected training dataset, a client computing device may still override the machine learning server computer's selection in favor of a different type of machine learning system.

In an embodiment, the machine learning server computer associates training datasets with machine learning parameters. Thus, if a client computing device selects a particular training dataset, the machine learning server computer may identify the parameters associated with the training dataset and use the associated parameters when building the machine learning system. Alternatively, the training datasets may be associated with default parameters. Thus, while the machine learning server computer may initially select one or more parameters based on the selected training dataset, a client computing device may still override the machine learning server computer's selection in favor of different parameters.

The associations between the training datasets and machine learning system and/or machine learning parameters may be specified by the client computing device and/or determined by the machine learning server computer. For example, when a machine learning training dataset is uploaded, the client computing device may specify a type of machine learning system and/or machine learning parameters to be associated with the machine learning training dataset. Alternatively, the machine learning server computer may identify optimal machine learning systems and/or parameters. For example, the machine learning server computer may identify machine learning systems and/or parameters that are frequently used with the machine learning training dataset and/or that tend to produce results with high accuracy. As another example, the machine learning server computer may use the hyperparameter optimization techniques described in Section 3.1 to identify optimal machine learning systems and/or parameters for a machine learning training dataset.

6. Machine Learning System User Interface

In an embodiment, a machine learning server computer provides a graphical user interface for generating a machine learning system. The graphical user interface may include options for selecting a machine learning system, changing configurations of a machine learning system, storing training datasets for training machine learning systems, selecting training sets for training particular machine learning systems, and efficiently viewing results of running a particular machine learning system.

FIG. 5 depicts an example graphical user interface for viewing or reviewing one or more sessions. Sessions, as described herein, are generated each time a user selects an option for generating a new session. For example, in response to receiving a selection of the "New" option in FIG. 5, the machine learning server computer may generate a new session with a new session identifier (ID). The session ID allows the machine learning server computer to uniquely identify different sessions as multiple sessions may include the same values, such as uploaded file and machine learning system.

In FIG. 5, each identified session includes information regarding the session ID, the uploaded file, the status of the machine learning session, the state of the machine learning session, the machine learning system, the date of creation of the session, and options to view the session and/or rerun the session. The uploaded file refers to the input file for the machine learning system. For example, the user session associated with SID-845 comprises the file "company file A056 . . . " which was uploaded by a user for classification or normalization. The status refers to whether the file has been classified or normalized. As the status for SID-845 is set to default, a machine learning system has not yet produced an output using "company file A056 . . . ."

The state of the session refers to the current step in progress for the session. For example, if the state of a session is "Select Columns," then the step of selecting columns for an input file has not been completed. The machine learning system refers to a machine learning type that has been selected for the uploaded file. For example, the machine learning system for SID-845 is Fuzzy Matching. In contrast, the machine learning system for SID-843 is an Encoder/Decoder neural network.

The actions column includes options for viewing the machine learning system and rerunning the machine learning system. In response to receiving a selection of the 'view' option, the graphical user interface may cause display of one or more screens for configuring the machine learning system for the selected session. A user computer may select the view option to view the configuration settings for the network and/or to change one or more configuration settings for the network. For example, a user may select SID-845, navigate to the machine learning tab, and select a different machine learning system. The user may then run the machine learning system using the same input file and training data, but with the newly selected machine learning system.

When a user computer selects an option for generating a new session, the graphical user interface may cause display of a request to upload an input file or select a stored input file for the session. Once an input file has been uploaded or selected, the graphical user interface may cause display of a "Select Columns" interface for identifying one or more types of input data.

FIG. 6 depicts an example graphical user interface for identifying one or more types of input data from an uploaded input file. The interface of FIG. 6 further depicts a portion of an input file that has been uploaded to the machine learning server computer. The input file comprises a plurality of rows corresponding to individual transactions and a plurality of columns comprising information about the transactions. The plurality of columns may differ from input dataset to input dataset based on differences in need and user. Thus, input datasets may include fewer columns, more columns, and/or different columns than is depicted in FIG. 6. Additionally, input datasets may include different types of data. For example, an input dataset may include images to be classified. Thus, different types of identification may be requested through the interface of FIG. 6. For example, if images of faces are being classified, the interface of FIG. 6 may request identification of coordinates that correspond to eyes.

Due to differences in input datasets, the graphical user interface may include options for identifying important columns for the machine learning system. The machine learning server computer may identify the names of each column and provide an interface for selecting important columns. In the example of FIG. 6 the machine learning system is being used to classify a plurality of different transactions. The user interface thus includes options for identifying a column with the supplier name and a column that includes descriptive information about the transaction. Each of the columns is provided as an option for supplier name and as an option for description. As various descriptions may span multiple columns, the option for identifying description columns may allow for selection of multiple columns. Alternatively, as the supplier name only appears in a single column, the option for identifying the supplier name may only allow for selection of one column.

By allowing the user to select columns of importance from the input dataset, the graphical user interface makes running a machine learning system with a new dataset efficient and easy to perform. The user does not have to remove data from a dataset that is filled with superfluous columns such as quantity or price. Instead, the user only needs to select which columns describe the transaction. Additionally, the selection of important columns allows the machine learning server computer to execute the machine learning system using only the most relevant data instead of over-including input data of little to no importance.

FIG. 6 depicts two options for selecting columns of importance: an option for selection of the supplier column and an option for selection of description columns. In other embodiments, the graphical user interface may include more or fewer options for selecting columns of importance. For example, a graphical user interface may include a single option for identifying columns that describe the transactions. Alternatively, a graphical user interface may include a plurality of columns including a Merchant Category column and a Transaction Code column.

Column selection in FIG. 6 may be based on column categories for the training. For example, if the training dataset included Merchant Category input and Description input, then the graphical user interface for selecting columns may be displayed with options for identifying the Merchant Category column and one or more Description columns. Alternatively, the graphical user interface may contain uniform options for selecting columns for each type of problem or category of data. For example, one set of columns may be selectable for categorization problems while another set of columns are selectable for normalization problems. As another example, a user may identify a category of data that is being categorized, such as healthcare records. Based on the selected category, machine learning server computer may determine which types of columns need to be identified.

Configuration of the graphical user interface for selecting columns may be performed prior to use of the machine learning user interface or may be configured as part of the use of the machine learning user interface. For example, particular data input types may be set in advance for types of problems, categories of data, types of machine learning systems, or any combination thereof. Alternatively, a user may specify which types of input can be identified when generating a category of data or uploading a training dataset.

The machine learning interface may also include options for selecting machine learning systems, selecting knowledge bases, selecting categories, and selecting any advanced settings. FIG. 7 depicts an example graphical user interface for configuring a machine learning system. The example graphical user interface of FIG. 7 comprises options for selecting a machine learning system, options for selecting one or more knowledge bases, options for selecting one or more categories, and advanced options for modifying a selected machine learning system.

Each machine learning system option corresponds to a machine learning configuration file and/or other machine learning configuration file that is stored on the machine learning server computer. The machine learning configuration files include instructions for configuring a machine learning system of a corresponding type. For example, the Naïve Bayes option in FIG. 7 corresponds to a machine learning configuration file comprising instructions for configuring a Naïve Bayes classifier. The machine learning configuration files may include default machine learning parameters and/or place holders for machine learning parameters to be defined using the machine learning interface.

The knowledge base options each correspond to stored knowledge base data which include inputs and verified outputs. Verified outputs, as used herein, refer to data that has been identified as the correct outputs for each input. For example, a particular knowledge base may be used to classify transactions based on the United Nations Standard Products and Services Codes (UNSPSC). Thus, the inputs for the particular knowledge base may include transaction and supplier details while the verified outputs for the knowledge base are the UNSPSC values that have been identified as correlating to each transaction. The knowledge bases may be stored in the machine learning server computer. Interfaces for defining and storing knowledge bases are described further herein.

The category options allow for the input dataset and subsequent output dataset to be categorized. Additionally, category selections may affect which training sets are available for training the selected machine learning system. For example, a selection of the education category may cause the machine learning server computer to filter options for training the machine learning system to training datasets within the education category. Category selections may also affect which training datasets are selected for subsequent runs of the machine learning system. For example, in embodiments where the machine learning server computer identifies inputs that were unable to be classified or normalized accurately after running the machine learning system, the machine learning server computer may select subsequent training sets from training sets within the selected categories.

The advanced options include various options for selecting and/or changing parameters of a selected machine learning system. In an embodiment, the advanced options are dependent on the selected machine learning system. For example, a Naïve Bayes classifier may have a first set of configurable parameters while the Encoder Decoder machine learning system has a second set of configurable parameters that are different from the first set of configurable parameters. Additionally, options for configuring a certain type of parameter may differ from machine learning system to machine learning system. For example, the graphical user interface may allow selection of a higher number of layers for some machine learning systems than for others.

In an embodiment, the configuration interface may additionally include an option for selecting a previously trained machine learning system. For example, previously trained machine learning systems may be stored on the machine learning server computer and/or an external storage system. The graphical user interface may include identifiers of the previous trained machine learning systems. The identifiers may indicate a type of machine learning system, one or more training datasets, and/or one or more parameters of the previously trained machine learning system. In response to a selecting of a previously trained machine learning system, the machine learning server computer may compute an output dataset using the previously trained machine learning system without training a new machine learning system, thereby saving on the compute time needed for training.

Figure 8:
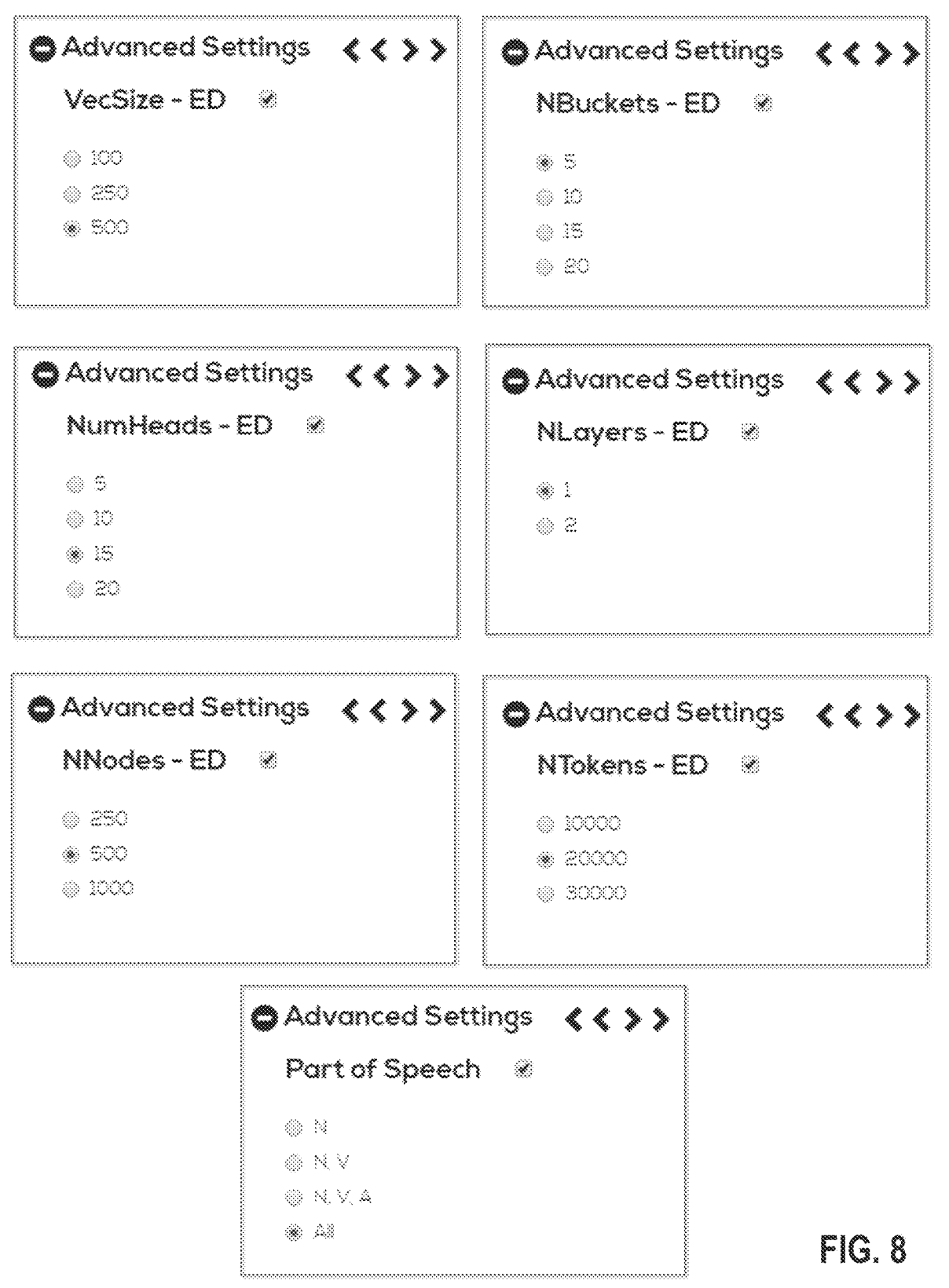

FIG. 8 depicts one or more examples of advanced settings for the machine learning system. The advanced settings may comprise one or more options to configure parameters of a particular type of machine learning system. As described above, the machine learning configuration files may include default parameters and/or empty values that are filled in based on selections in the advanced settings when the machine learning system is run.

The options depicted in FIG. 8 include generalized options, such as the part of speech option, and options that are specific to an Encoder Decoder neural network. Other options than those depicted in FIG. 8 may be available for Encoder Decoder neural networks. Additionally, different options may be available for different types of machine learning systems.

The VecSize option is an example of a configuration option for selecting the vector size for a machine learning system. The NBuckets option is an example of a configuration option for selecting a number of buckets for a machine learning system. The NumHeads option is an example of a configuration option for selecting a number of heads for a machine learning system. The NLayers option is an example configuration option for selecting the number of layers in a machine learning system. The NNodes option is an example of a configuration option for selecting the number of nodes for a machine learning system. The NTokens option is an example of a configuration option for selecting a number of tokens for a machine learning system.

While the example options of FIG. 8 include a limited number of selectable options, in an embodiment, one or more parameter input options allow a user to freely define a value for a parameter. For example, the vector size option may allow a user to enter any value into a text box. The machine learning system may then be configured with the entered value as the vector size. Alternatively, the options may be limited by minimum and/or maximum values. For example, the vector size option may be limited by a minimum value of 100 and a maximum value of 1000. If a user enters a number outside of the defined range, the graphical user interface may display an error to the user and request a new value be entered.

The parts of speech option depicted in FIG. 8 corresponds to which words are identified as inputs for the machine learning system. For example, if the description data in an input dataset is overly verbose, a user may want to limit the inputs to just nouns. Alternatively, if the description data is relatively sparse in an input dataset, a user may wish to include verbs and adjectives. As a first pass, the machine learning server computer may filter the input dataset based on the type of speech selected in the advanced settings.

Figure 9:
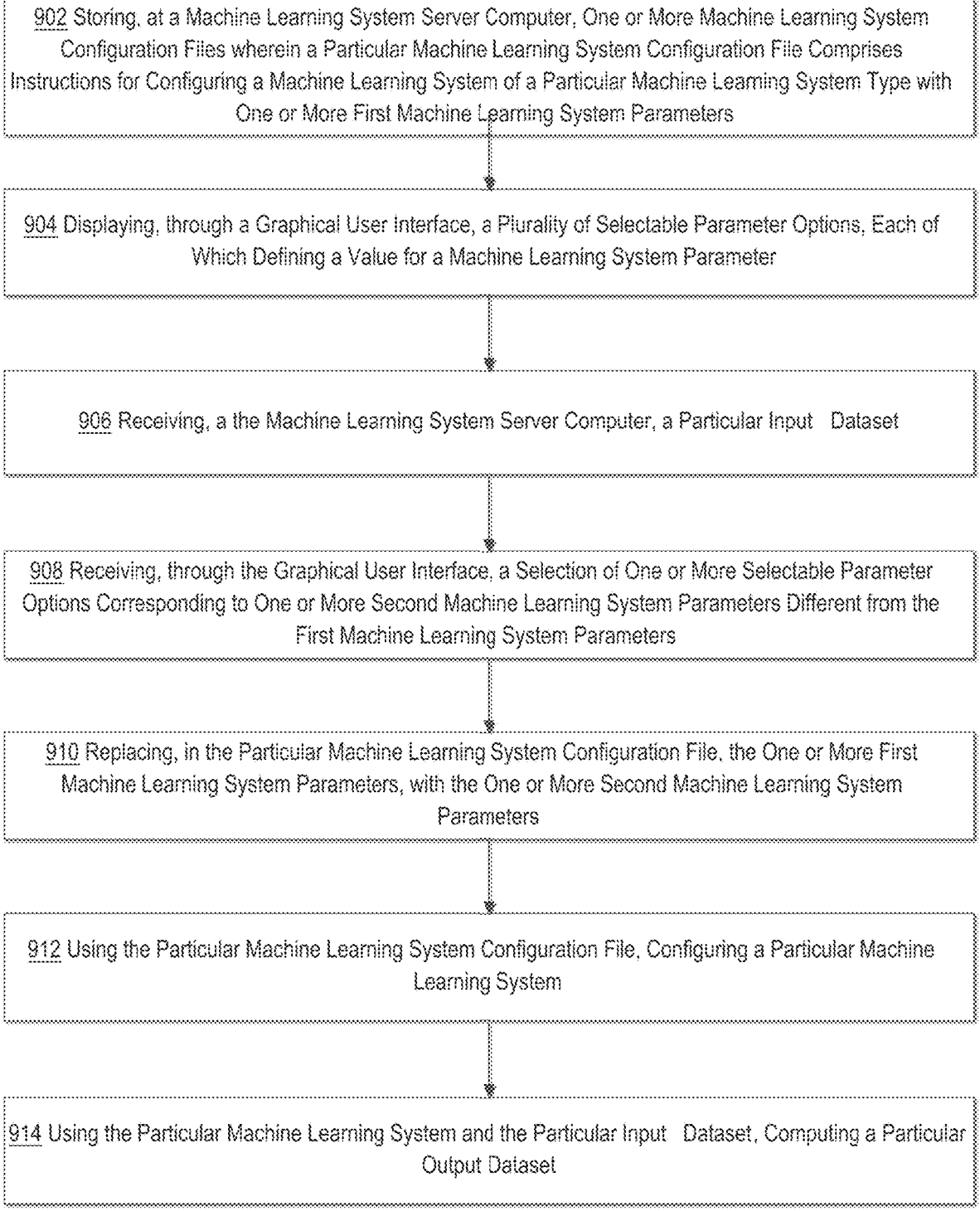
FIG. 9 depicts a method of configuring and running a machine learning system using a machine learning system interface.

FIG. 9 depicts a method of configuring and running a machine learning system using a machine learning interface.

At step 902, one or more machine learning configuration files are stored at a machine learning server computer. A particular machine learning configuration file of the one or more machine learning configuration files comprises instructions for configuring a machine learning system of a particular machine learning type with one or more first machine learning parameters. For example, the machine learning server computer may store a configuration file that includes instructions for building a Naive Bayes classifier with one or more default parameters that are configurable through the graphical user interface. Default parameters may include default values and/or placeholder values. For example, the machine learning server computer may be programmed or configured to input values into the configuration file based on selections of parameters through the advanced settings in the graphical user interface. While some parameter values may be selected by default, they may not be initially entered in the configuration file.

At step 904, a plurality of selectable parameter options is displayed through a graphical user interface. Each of the selectable parameter options define a value for a machine learning parameter. For example, one or more of the advanced settings of FIG. 8 may be displayed on a client computing device. The advanced settings of FIG. 8 include selectable parameter options for machine learning parameters. For example, the advanced setting of "VecSize" includes three selectable parameter options for the vector size parameter.

At step 906, a particular input dataset is received at the machine learning server computer. For example, a client computing device may upload an input file comprising input data to the machine learning server computer. The machine learning server computer may display a graphical user interface for defining inputs in the particular input dataset, such as the interface depicted in FIG. 6.

At step 908, a selection of one or more selectable parameter options corresponding to one or more second machine learning parameters different from the first machine learning parameters is received at the machine learning server computer. For example, a configuration file for a Long Short Term Memory neural network may include a default value of 250 for the vector size parameter. A user may select the value of 500 for the vector size parameter through the advanced options of FIG. 8.

Once the user is finished selecting configuration options for the machine learning system, the user may select an option to run the machine learning system using the input dataset and the configuration options. Upon receiving a request to run the machine learning system, the machine learning server computer may identify a configuration file based on the machine learning system identified in FIG. 7. For example, if the Encoder Decoder neural network is selected in FIG. 7, the machine learning server computer may identify a configuration file for building an Encoder Decoder neural network.

At step 910, the one or more first machine learning parameters in the particular machine learning configuration file are replaced with the one or more second machine learning parameters. In an embodiment, replacing the one or more first machine learning parameters in the particular machine learning configuration file with the one or more second machine learning parameters comprises configuring a machine learning system using the selected parameters without altering the configuration file. Thus, the one or more first machine learning parameters are replaced with new values when the machine learning system is initially configured. For example, the configuration file may comprise pointers to memory address locations of the machine learning server computer for the one or more first machine learning parameters. When the machine learning system is configured, the machine learning server computer may be programmed or configured to replace the pointers with the one or more second machine learning parameters stored in the memory address locations.

The machine learning server computer may alter the selected configuration file based on one or more parameters selected through the advanced settings. For example, the configuration file for the Decoder Encoder neural network may include a section that defines the vector size. If a vector size of 500 is selected in the advanced options, the machine learning server computer may alter the configuration file to identify the vector size as 500. Altering the configuration file may comprise replacing a default value from the definition of a parameter with a selected value for the parameter. Altering the configuration file may also include replacing a placeholder/blank value with the selected value for the parameter. For example, the configuration file may include a space for defining the vector size, but not include a value for the vector size. The machine learning server computer may define the value for the parameter using the value selected through the graphical user interface.

In an embodiment, the machine learning server computer uses default parameters if no parameter has been selected. For example, default parameters may be preselected in the advanced options interface. Additionally and/or alternatively, the configuration files may comprise default parameters that are used if different parameters have not been selected. Default parameters may be pre-computed or selected through the hyperparameter optimization techniques described above. Default parameters may be specific to machine learning types, training datasets, categories, and/or any combination thereof.

At step 912, a machine learning system is configured using the particular machine learning configuration file. For example, the machine learning server computer may execute configuration instructions within the configuration file to generate a machine learning system of the selected type with the selected parameters. Additionally or alternatively, the machine learning system may send the configuration to a separate server computer. The separate server computer may use the configuration file to configure a machine learning system of the selected type with the selected parameters.

In an embodiment, the machine learning server computer additionally trains the machine learning system using one or more training datasets. The one or more training datasets may be selected through a graphical user interface, such as the graphical user interface of FIG. 7. Additionally or alternatively, the training datasets may be provided by a client computing device and/or stored as default training datasets for training machine learning systems.

At step 914, a particular output dataset is computed using the particular machine learning system and the particular input dataset. The machine learning server computer may be programmed or configured to use the configured machine learning system to compute outputs from the inputs. For example, the machine learning system may comprise a plurality of equations, a plurality of weights that are computed through a training of the machine learning system, and a plurality of possible outputs. The machine learning server computer may use the equations and weights of the machine learning system to compute outputs for each of the input values of the particular input dataset.

In an embodiment, the machine learning server computer provides an interface for uploading and defining training datasets. FIG. 10 depicts an example graphical user interface for uploading new training datasets and/or editing existing training datasets. FIG. 10 includes an option for entering a hyperlink to a training dataset and/or uploading a training dataset through a drag and drop interface or a browser window. FIG. 10 additionally includes options for searching through existing training datasets to view and/or edit a training dataset.

After a new training dataset has been uploaded and/or an existing training dataset has been selected, the machine learning server computer may display a graphical user interface for defining the training dataset. FIG. 11 depicts an example graphical user interface for identifying inputs and outputs in an uploaded training dataset. The interface for FIG. 11 includes the uploaded training dataset, options for identifying outputs, and options for identifying inputs. In FIG. 11, the outputs are defined as the 'Categorization' and the 'Normalized Supplier.' The 'Normalized Supplier' output is an output for machine learning systems performing normalization while the 'Categorization' output is an output for machine learning systems performing classification.

Any number of inputs and outputs may be defined through the graphical user interface. In FIG. 11 two outputs are defined based on two sets of inputs. Other embodiments may include more or fewer outputs and/or inputs. For example, a basic interface may include a single output and a single input. A more complicated interface may include six outputs and five inputs. Input fields and output fields may be kept static to create uniformity across different training datasets. The uniformity allows multiple training datasets to be used for a particular execution of a machine learning system.

Additionally and/or alternatively, the input fields and output fields may be user generated and/or user selected. For example, a user may create a new category for a training dataset. When creating the new category, the user may be asked to define the types of inputs and outputs. Types of inputs and outputs may be defined manually, such as through a text entry interface, or selected from a plurality of input and output types. The interface may additionally request the user identify relationships between the inputs and outputs. For example, the user may be asked to define, for each output, what types of inputs affect the output. When a client later uploads an input file, the option to define inputs and outputs may be based on a selected category for the uploaded file.

In FIG. 11, the input and output types are predefined. The interface includes options for identifying a single column for each output and one or more columns for the inputs. For example, the 'Raw Supplier' input is a single input defined by a single column. In contrast, the 'Description' input may be defined by a plurality of columns. While both the 'Raw Supplier' input and the 'Description' inputs may be used as inputs in a normalization machine learning system, they are treated as different types of inputs. In contrast, the "Merchant Category" column and the "Summary of the expenditure" column, as defined in FIG. 11, both fall under the 'Description' column and thus are treated interchangeably.

The machine learning server computer saves training datasets that have been configured through the machine learning interface. The saved training datasets may then be selected to train a machine learning system. Additionally, the machine learning server computer may save multiple versions of a training dataset in response to receiving input editing and saving an existing training dataset. The machine learning server computer may additionally update a training dataset using an input dataset that was used to run a machine learning system trained on the training dataset and the output dataset produced by the machine learning system.

By providing a graphical user interface for selecting machine learning configurations, such as parameter values and training data, the machine learning server computer creates a more efficient method of generating a machine learning system. Additionally, the machine learning server computer saves on memory space by storing single configuration files that can be used to generate machine learning systems with different parameters instead of storing machine learning configuration files for each machine learning system. Finally, the machine learning server computer saves on memory by storing configuration files instead of storing configured machine learning systems for each combination of machine learning system, parameters, and training files.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
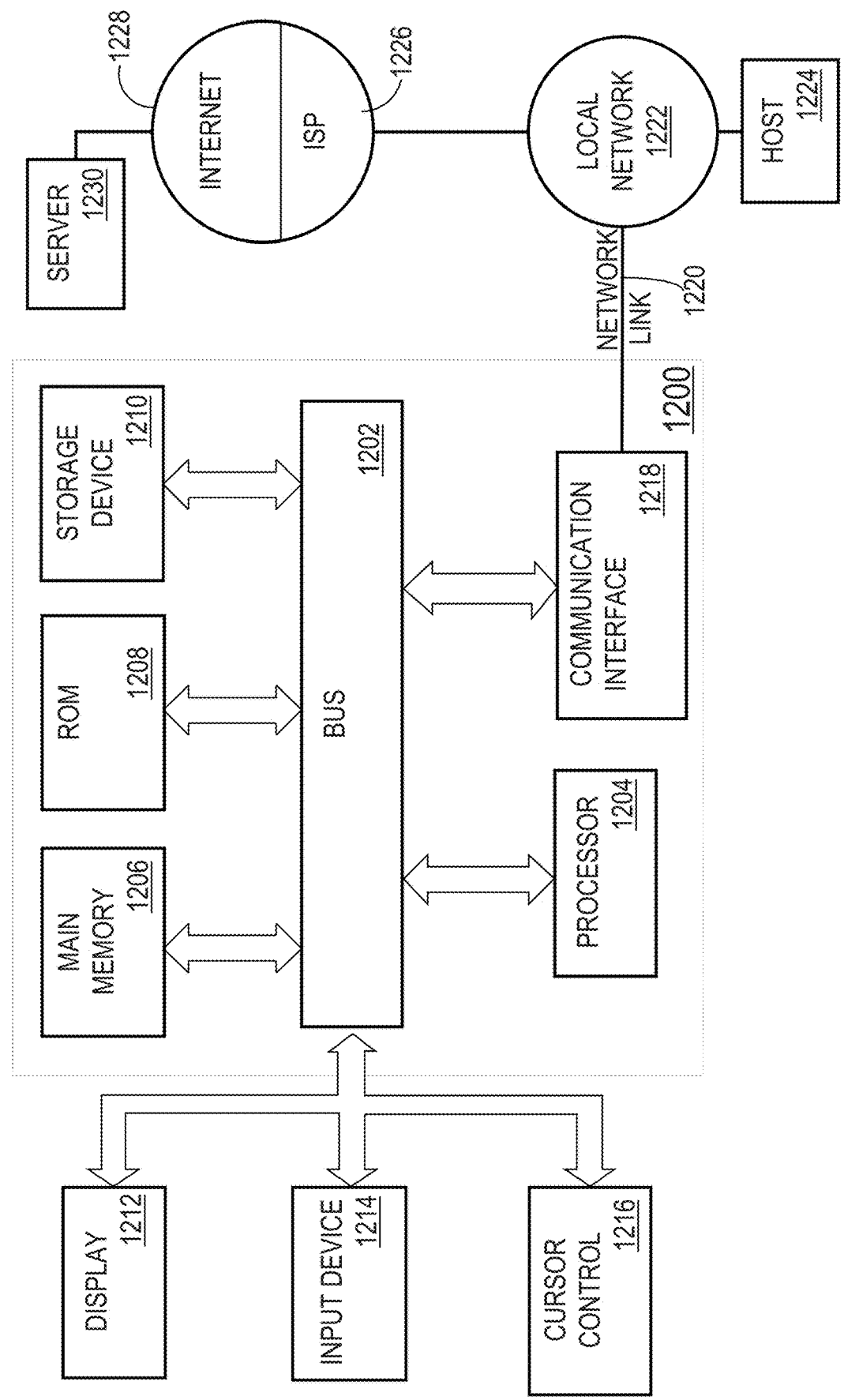
FIG. 12 is a block diagram that illustrates a computer system upon which embodiments may be implemented.

For example, FIG. 12 is a block diagram that illustrates a computer system 1200 upon which embodiments may be implemented. Computer system 1200 includes a bus 1202 or other communication mechanism for communicating information, and a hardware processor 1204 coupled with bus 1202 for processing information. Hardware processor 1204 may be, for example, a general-purpose microprocessor.

Computer system 1200 also includes a main memory 1206, such as a random-access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read-only memory (ROM) 1208 or other static storage device coupled to bus 1202 for storing static information and instructions for processor 1204. A storage device 1210, such as a magnetic disk, optical disk, or solid-state drive is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1210. Volatile media includes dynamic memory, such as main memory 1206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the worldwide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method comprising:
   storing, at a machine learning server computer, one or more machine learning configuration files, a particular machine learning configuration file of the one or more machine learning configuration files comprising instructions for configuring a machine learning system of a particular machine learning type with one or more first machine learning parameters;
   displaying, through a graphical user interface, a plurality of selectable neural network type options and a plurality of selectable parameter options, each of which defines a value for a machine learning parameter, wherein the plurality of selectable neural network type options each defines a type of machine learning system;
   receiving, at the machine learning server computer, a particular input dataset;
   receiving, through the graphical user interface, a selection of a first selectable neural network type option and a selection of one or more selectable parameter options corresponding to one or more second machine learning parameters different from the one or more first machine learning parameters;

configuring a particular machine learning system based, at least in part, on the selection of the first selectable neural network type option;

replacing, in the particular machine learning configuration file, the one or more first machine learning parameters with the one or more second machine learning parameters;

using the particular machine learning configuration file, configuring the particular machine learning system;

using the particular machine learning system and the particular input dataset, computing a particular output dataset;

receiving, through the graphical user interface, a selection of a particular selectable training option corresponding to a particular machine learning training dataset, wherein the particular machine learning training dataset is different from the particular input dataset;

in response to configuring the particular machine learning system, training the particular machine learning system using the particular machine learning training dataset;

wherein the plurality of selectable neural network type options comprises: Naive Bayes, Encoder Decoder, and Long Short Term Memory;

storing, at the machine learning server computer, a confidence score threshold value;

the particular output dataset comprising, for each of a plurality of data items in the particular output dataset, an output confidence score;

determining that a subset of the plurality of data items in the particular output dataset comprise confidence scores below the confidence score threshold value;

in response to determining that the subset of the plurality of data items in the particular output dataset comprise confidence scores below the confidence score threshold value;

computing a second output dataset;

replacing one or more data items in the subset of the particular output dataset with one or more corresponding items in the second output dataset.

2. The computer-implemented method of claim 1, a second machine learning configuration file of the one or more machine learning configuration files comprising instructions for configuring a machine learning system of a second machine learning type with one or more third machine learning parameters, the method further comprising:

receiving, at the machine learning server computer, a second input dataset;

receiving, through the graphical user interface, a selection of a second selectable neural network type option corresponding to a machine learning system of the second machine learning type;

based, at least in part, on the selection of the second selectable neural network type option, using the second machine learning configuration file, configuring a second machine learning system;

computing the second output dataset using the second machine learning system and the second input dataset.

3. The computer-implemented method of claim 1, further comprising:

storing, at the machine learning server computer, a plurality of machine learning training datasets;

displaying, through the graphical user interface, a plurality of selectable training options, each of which corresponds to a machine learning training dataset of the plurality of machine learning training datasets.

4. The computer-implemented method of claim 3, further comprising:

storing, for each machine learning training dataset of the plurality of machine learning training datasets, category data identifying a data category for the machine learning training dataset;

receiving, through the graphical user interface, input categorization data identifying a particular data category for the particular input dataset;

determining that each of the plurality of machine learning training datasets corresponds to the particular data category and, in response, displaying the plurality of selectable training options.

5. The computer-implemented method of claim 3, further comprising:

identifying a subset of the particular input dataset that corresponds to the subset of the plurality of data items in the particular output dataset;

receiving, through the graphical user interface, a selection of a second selectable training option corresponding to a second machine learning training dataset of the plurality of machine learning training datasets;

using the particular machine learning configuration file, configuring a second machine learning system;

training the second machine learning system using the second machine learning training dataset;

computing the second output dataset using the second machine learning system and the subset of the particular input dataset.

6. The computer-implemented method of claim 5, further comprising:

storing, for each machine learning training dataset of the plurality of machine learning training datasets, category data identifying a data category for the machine learning training dataset, the particular machine learning training dataset corresponding to a particular data category;

in response to determining that the subset of the plurality of data items in the particular output dataset comprise confidence scores below the confidence score threshold value, displaying, through the graphical user interface, a subset of the plurality of selectable training options, wherein each of the subsets of the plurality of selectable training options corresponds to the particular data category;

receiving the selection of the second selectable training option from the subset of the plurality of selectable training options.

7. The computer-implemented method of claim 3, further comprising:

storing, for each machine learning training dataset of the plurality of machine learning training datasets, category data identifying a data category for the machine learning training dataset;

the particular machine learning training dataset corresponding to a particular data category;

identifying one or more machine learning training datasets corresponding to the particular data category;

automatically selecting, from the one or more machine learning training datasets, a second machine learning training dataset;

using the particular machine learning configuration file, configuring a second machine learning system;

training the second machine learning system using the second machine learning training dataset of the plurality of machine learning training datasets;

computing the second output dataset using the second machine learning system and the subset of the particular input dataset.

8. The computer-implemented method of claim 1, a second machine learning configuration file of the one or more machine learning configuration files comprising instructions for configuring a machine learning system of a second machine learning type with one or more third machine learning parameters, and wherein the method further comprises:
displaying, through the graphical user interface, a plurality of selectable network type options, each of which defines a type of machine learning system;
receiving, through the graphical user interface, a selection of both a first selectable network type option corresponding to a machine learning system of the particular machine learning type and a second selectable network type option corresponding to a machine learning system of the second machine learning type;
configuring the particular machine learning system based, at least in part, on the selection of the first selectable network type option;
based, at least in part, on the selection of the second selectable network type option, using the second machine learning configuration file, configuring a second machine learning system;
computing the second output dataset using the second machine learning system and the particular input dataset.

9. The computer-implemented method of claim 1, further comprising:
storing, at the machine learning server computer, a plurality of machine learning training datasets;
displaying, through the graphical user interface, a plurality of selectable training options, each of which corresponds to a machine learning training dataset of the plurality of machine learning training datasets;
receiving, through the graphical user interface, a selection of both a particular selectable training option corresponding to a particular machine learning training dataset and a second selectable option corresponding to a second machine learning training dataset;
using the particular machine learning configuration file, configuring a second machine learning system;
in response to configuring the particular machine learning system, training the particular machine learning system using the particular machine learning training dataset;
in response to configuring the second machine learning system, training the second machine learning system using the second machine learning training dataset;
computing the second output dataset using the second machine learning system and the particular input dataset.

10. The computer-implemented method of claim 1, further comprising:
configuring a plurality of test machine learning systems of the particular machine learning type, each of which comprising different machine learning parameters;
using a test input dataset and the plurality of test machine learning systems, computing a plurality of test output datasets;
determining that an output of a particular test machine learning system of the plurality of test machine learning systems is more accurate than outputs of each other test machine learning system of the plurality of test machine learning systems, the particular test machine learning system comprising the one or more first machine learning parameters;
in response to determining that the output of the particular test machine learning system is more accurate than each other test machine learning system, storing the particular machine learning configuration file with the one or more first machine learning parameters.

11. The computer-implemented method of claim 1, further comprising:
storing, at the machine learning server computer, a plurality of machine learning training datasets;
displaying, through the graphical user interface, a plurality of selectable training options, each of which corresponds to a machine learning training dataset of the plurality of machine learning training datasets;
receiving, through the graphical user interface, a selection of a particular selectable training option corresponding to a particular machine learning training dataset;
in response to computing the particular output dataset, updating the particular machine learning training dataset using the particular input dataset and the particular output dataset.

12. A computer system comprising:
one or more processors;
one or more non-transitory computer-readable storage media storing one or more sequences of instructions which, when executed by the one or more processors, cause the one or more processors to execute:
storing one or more machine learning configuration files, a particular machine learning configuration file of the one or more machine learning configuration files comprising instructions for configuring a machine learning system of a particular machine learning type with one or more first machine learning parameters;
displaying, through a graphical user interface, a plurality of selectable neural network type options and a plurality of selectable parameter options, each of which defines a value for a machine learning parameter, wherein the plurality of selectable neural network type options each defines a type of machine learning system;
receiving a particular input dataset;
receiving, through the graphical user interface, a selection of a first selectable neural network type option and a selection of one or more selectable parameter options corresponding to one or more second machine learning parameters different from the one or more first machine learning parameters;
configuring a particular machine learning system based, at least in part, on the selection of the first selectable neural network type option;
replacing, in the particular machine learning configuration file, the one or more first machine learning parameters with the one or more second machine learning parameters;
using the particular machine learning configuration file, configuring the particular machine learning system;
using the particular machine learning system and the particular input dataset, computing a particular output dataset;
receiving, through the graphical user interface, a selection of a particular selectable training option corresponding to a particular machine learning training dataset, wherein the particular machine learning training dataset is different from the particular input dataset;
in response to configuring the particular machine learning system, training the particular machine learning system using the particular machine learning training dataset;

wherein the plurality of selectable neural network type options comprises: Naive Bayes, Encoder Decoder, and Long Short Term Memory;

storing a confidence score threshold value;

the particular output dataset comprising, for each of a plurality of data items in the particular output dataset, an output confidence score;

determining that a subset of the plurality of data items in the particular output dataset comprise confidence scores below the confidence score threshold value;

in response to determining that the subset of the plurality of data items in the particular output dataset comprise confidence scores below the confidence score threshold value;

computing a second output dataset;

replacing one or more data items in the subset of the particular output dataset with one or more corresponding items in the second output dataset.

13. The computer system of claim 12, a second machine learning configuration file of the one or more machine learning configuration files comprising one or more second sequences of instructions for configuring a machine learning system of a second machine learning type with one or more third machine learning parameters and which second sequences of instructions, when executed by the one or more processors, cause the one or more processors to execute:

receiving, a second input dataset;

receiving, through the graphical user interface, a selection of a second selectable neural network type option corresponding to a machine learning system of the second machine learning type;

based, at least in part, on the selection of the second selectable neural network type option, using the second machine learning configuration file, configuring a second machine learning system;

computing the second output dataset using the second machine learning system and the second input dataset.

14. The computer system of claim 12, further comprising sequences of instructions which when executed by the one or more processors cause the one or more processors to execute:

storing a plurality of machine learning training datasets;

displaying, through the graphical user interface, a plurality of selectable training options, each of which corresponds to a machine learning training dataset of the plurality of machine learning training datasets.

15. The computer system of claim 14, further comprising sequences of instructions which when executed by the one or more processors cause the one or more processors to execute:

storing, for each machine learning training dataset of the plurality of machine learning training datasets, category data identifying a data category for the machine learning training dataset;

receiving, through the graphical user interface, input categorization data identifying a particular data category for the particular input dataset;

determining that each of the plurality of machine learning training datasets corresponds to the particular data category and, in response, displaying the plurality of selectable training options.

16. The computer system of claim 14, further comprising sequences of instructions which when executed by the one or more processors cause the one or more processors to execute:

identifying a subset of the particular input dataset that corresponds to the subset of the plurality of data items in the particular output dataset;

receiving, through the graphical user interface, a selection of a second selectable training option corresponding to a second machine learning training dataset of the plurality of machine learning training datasets;

using the particular machine learning configuration file, configuring a second machine learning system;

training the second machine learning system using the second machine learning training dataset;

computing the second output dataset using the second machine learning system and the subset of the particular input dataset.

17. The computer system of claim 16, further comprising sequences of instructions which when executed by the one or more processors cause the one or more processors to execute:

storing, for each machine learning training dataset of the plurality of machine learning training datasets, category data identifying a data category for the machine learning training dataset, the particular machine learning training dataset corresponding to a particular data category;

in response to determining that the subset of the plurality of data items in the particular output dataset comprise confidence scores below the confidence score threshold value, displaying, through the graphical user interface, a subset of the plurality of selectable training options, wherein each of the subsets of the plurality of selectable training options corresponds to the particular data category;

receiving the selection of the second selectable training option from the subset of the plurality of selectable training options.

18. The computer system of claim 14, further comprising sequences of instructions which when executed by the one or more processors cause the one or more processors to execute:

storing, for each machine learning training dataset of the plurality of machine learning training datasets, category data identifying a data category for the machine learning training dataset;

the particular machine learning training dataset corresponding to a particular data category;

identifying one or more machine learning training datasets corresponding to the particular data category;

automatically selecting, from the one or more machine learning training datasets, a second machine learning training dataset;

using the particular machine learning configuration file, configuring a second machine learning system;

training the second machine learning system using the second machine learning training dataset of the plurality of machine learning training datasets;

computing the second output dataset using the second machine learning system and the subset of the particular input dataset.

19. The computer system of claim 12, a second machine learning configuration file of the one or more machine learning configuration files comprising one or more second sequences of instructions for configuring a machine learning system of a second machine learning type with one or more third machine learning parameters, which second sequences of instructions, when executed by the one or more processors, cause the one or more processors to execute:

displaying, through the graphical user interface, a plurality of selectable network type options, each of which defines a type of machine learning system;

receiving, through the graphical user interface, a selection of both a first selectable network type option corresponding to a machine learning system of the particular machine learning type and a second selectable network type option corresponding to a machine learning system of the second machine learning type;

configuring the particular machine learning system based, at least in part, on the selection of the first selectable network type option;

based, at least in part, on the selection of the second selectable network type option, using the second machine learning configuration file, configuring a second machine learning system;

computing the second output dataset using the second machine learning system and the particular input dataset, computing a second output dataset.

20. The computer system of claim 12, further comprising sequences of instructions which when executed by the one or more processors cause the one or more processors to execute:

storing a plurality of machine learning training datasets;

displaying, through the graphical user interface, a plurality of selectable training options, each of which corresponds to a machine learning training dataset of the plurality of machine learning training datasets;

receiving, through the graphical user interface, a selection of both a particular selectable training option corresponding to a particular machine learning training dataset and a second selectable option corresponding to a second machine learning training dataset;

using the particular machine learning configuration file, configuring a second machine learning system;

in response to configuring the particular machine learning system, training the particular machine learning system using the particular machine learning training dataset;

in response to configuring the second machine learning system, training the second machine learning system using the second machine learning training dataset;

computing the second output dataset using the second machine learning system and the particular input dataset.

21. The computer system of claim 12, further comprising sequences of instructions which when executed by the one or more processors cause the one or more processors to execute:

configuring a plurality of test machine learning systems of the particular machine learning type, each of which comprising different machine learning parameters;

using a test input dataset and the plurality of test machine learning systems, computing a plurality of test output datasets;

determining that an output of a particular test machine learning system of the plurality of test machine learning systems is more accurate than outputs of each other test machine learning system of the plurality of test machine learning systems, the particular test machine learning system comprising the one or more first machine learning parameters;

in response to determining that the output of the particular test machine learning system is more accurate than each other test machine learning system, storing the particular machine learning configuration file with the one or more first machine learning parameters.

22. The computer system of claim 12, further comprising sequences of instructions which when executed by the one or more processors cause the one or more processors to execute:

storing a plurality of machine learning training datasets;

displaying, through the graphical user interface, a plurality of selectable training options, each of which corresponds to a machine learning training dataset of the plurality of machine learning training datasets;

receiving, through the graphical user interface, a selection of a particular selectable training option corresponding to a particular machine learning training dataset;

in response to computing the particular output dataset, updating the particular machine learning training dataset using the particular input dataset and the particular output dataset.

* * * * *